(12) United States Patent
Schlater

(10) Patent No.: US 10,611,221 B2
(45) Date of Patent: Apr. 7, 2020

(54) PROFILE ELEMENT FOR CONNECTING A VEHICLE WINDOW PANE TO AN AUXILIARY DEVICE

(71) Applicant: Creative Extruded Products, Inc., Tipp City, OH (US)

(72) Inventor: Timothy J. Schlater, Ludlow Fall, OH (US)

(73) Assignee: CREATIVE EXTRUDED PRODUCTS, INC., Tipp City, OH (US)

( * ) Notice: Subject to any disclaimer, the term of this patent is extended or adjusted under 35 U.S.C. 154(b) by 113 days.

(21) Appl. No.: 15/977,743

(22) Filed: May 11, 2018

(65) Prior Publication Data

US 2019/0031005 A1    Jan. 31, 2019

Related U.S. Application Data

(60) Provisional application No. 62/536,724, filed on Jul. 25, 2017.

(51) Int. Cl.
*B60J 10/32* (2016.01)
*B60J 10/70* (2016.01)
*B60J 10/25* (2016.01)
*B60J 10/26* (2016.01)

(52) U.S. Cl.
CPC .............. *B60J 10/32* (2016.02); *B60J 10/25* (2016.02); *B60J 10/26* (2016.02); *B60J 10/70* (2016.02)

(58) Field of Classification Search
CPC ... B60J 10/70; B60J 10/18; B60J 10/32; B60J 10/26

USPC ..................................................... 296/146.15
See application file for complete search history.

(56) References Cited

U.S. PATENT DOCUMENTS

| 8,251,432 B2 | 8/2012 | Schaff et al. |
| 8,628,137 B2* | 1/2014 | Platt ......................... B60J 10/70 296/93 |
| 10,239,386 B2* | 3/2019 | De Paoli .................. B60J 10/70 |
| 2007/0246966 A1 | 10/2007 | Polke |

(Continued)

FOREIGN PATENT DOCUMENTS

WO    2016198217    12/2016

OTHER PUBLICATIONS

Patent Cooperation Treaty, International Search Report for PCT/US2018/043493, 4pgs. dated Dec. 12, 2018.

*Primary Examiner* — Pinel E Romain
(74) *Attorney, Agent, or Firm* — Bryan Cave Leighton Paisner LLP

(57) ABSTRACT

A profile element is provided for connecting a window pane to an auxiliary device. The profile element includes first and second legs formed from rigid polymer material and that collectively define a U-shaped retention cavity. A resilient knee element is connected to a leading end of the first leg, and a rigid detent element is connected to the knee element opposite the connection to the first leg. The rigid detent element extends into the retention cavity and is configured to snap into locking engagement with a fastening dart on the auxiliary device, to provide an audible and tactile snap that can confirm proper assembly of the elements. The second leg does not deflect relative to the first leg during installation or extraction of the auxiliary device, and the rigid contact points produced at the retention cavity enable lateral movements of the auxiliary device when necessary.

20 Claims, 27 Drawing Sheets

(56) References Cited

U.S. PATENT DOCUMENTS

2011/0285177 A1  11/2011  Flammer et al.
2016/0229278 A1   8/2016  Timmerman

\* cited by examiner

PROFILE ELEMENT FOR CONNECTING A VEHICLE WINDOW PANE TO AN AUXILIARY DEVICE

CROSS-REFERENCE TO RELATED APPLICATIONS

This application claims priority to U.S. Application No. 62/536,724, filed Jul. 25, 2017, the entirety of which is incorporated herein by reference.

TECHNICAL FIELD

This application relates generally to profile elements used to connect separately-formed parts used on vehicles. More specifically, this application describes profile elements that connect auxiliary devices such as a cover or panel to a window pane of the vehicle (e.g., the windshield or the like).

BACKGROUND

Contoured profile elements are provided at various portions of a vehicle to connect elements together. For example, a water drain box cover or other panel (defining an "auxiliary device") is often mounted underneath a vehicle window pane such as the primary windshield. In this example, the water drain box cover is positioned to allow the water drain box to collect water flowing over the window pane and then drain it out of the vehicle in a desired manner. For ease of assembly, the contoured profile elements generally include a snap-in retention groove configured to receive and retain a fastening dart or similar structure included on the auxiliary device.

For example, one conventional design of a profile element is shown in U.S. Pat. No. 8,991,893 to Platt et al., which discloses one such design for locking an auxiliary device in position underneath a window pane with a sealed engagement. The profile element of this Platt patent is specifically tailored to reduce the insertion force needed to connect the auxiliary device to the window pane, so as to avoid the need for supporting the profile element by resting it on a portion of the vehicle body, as was typical in then-conventional designs. However, by redesigning the profile element in such a manner, the connection of these elements does not generate a significant snap sound or tactile feeling when the parts are properly connected. As a result of this lack of audible or tactile feedback, it can be difficult for installers or assembly personnel to be assured that the auxiliary device is properly installed relative to the window pane. This may lead to unnecessary removal and re-installation of these elements in some circumstances.

Moreover, the profile element of the Platt patent is a relatively complex design including a separate seal member that must also be accurately placed into engagement with the auxiliary device during the installation process. These complexities increase the cost and potential failure points for the profile element. Moreover, when extracting the auxiliary device from the profile element of the Platt patent to disassemble these elements, a resilient end leg defining one side of the retention groove must be deflected away from the remainder of the profile element a significant amount to allow for release of the fastening dart of the auxiliary device. The resilient end leg must therefore be manufactured to withstand these significant deflections during use, which results in additional complexities and costs.

Another conventional design of a profile element is shown in U.S. Pat. No. 8,251,432 to Schaff et al., which discloses a profile element having two profile arm portions separated from one another along one side of the retention groove. This multi-portion assembly provides allegedly desirable input and output force requirements when assembling or disassembling the auxiliary device with the window pane, but once again, the particular molding is complex and has an increased number of potential fail points in the design. Thus, the profile element in Schaff may be subject to additional maintenance or replacement requirements than other conventional designs. In addition, these conventional designs have also proven to be subject to undesirable thermal expansion stresses and/or unintended release caused by vibrations that may occur during operation of the vehicle.

Accordingly, it would be desirable to provide a contoured profile element that addresses these and other concerns with conventional profile element designs.

SUMMARY

In one aspect, a profile element for connecting a vehicle window pane to an auxiliary device includes a first leg including a first leading end and configured to be positioned adjacent to a terminal edge of the window pane. A second leg extends from the first leg at a junction opposite the first leading end of the first leg and extends to a second leading end. The first and second legs collectively define a generally U-shaped retention cavity configured to receive a fastening dart of the auxiliary device, wherein the first and second legs are formed from a rigid polymer material. A resilient knee element formed from a flexible polymer material is connected to the first leading end of the first leg. The knee element is configured to act as a seal along the terminal edge of the window pane. A detent element is formed from rigid polymer material and is connected to the knee element opposite the first leg. The rigid detent element projects towards and into the retention cavity in a rest position of the knee element. The detent element is configured to engage the fastening dart of the auxiliary device to retain the auxiliary device in position when the fastening dart is inserted into the retention cavity. The knee element flexes and moves to enable movement of the detent element during installation or extraction of the fastening dart relative to the retention cavity.

In another aspect, an assembly includes a window pane having an outer surface, an inner surface, and a terminal edge and an auxiliary device having a fastening dart. A profile element is positioned between the window pane and the auxiliary device and connects the windshield and the auxiliary device. The profile element includes a first leg including a first leading end and positioned adjacent to a terminal edge of the window pane. A second leg extends from the first leg at a junction opposite the first leading end of the first leg and extends to a second leading end. The first and second legs collectively define a generally U-shaped retention cavity configured to receive the fastening dart of the auxiliary device, wherein the first and second legs are formed from a rigid polymer material. A resilient knee element formed from a flexible polymer material is connected to the first leading end of the first leg. The knee element is configured to act as a seal along the terminal edge of the window pane. A detent element is formed from rigid polymer material and is connected to the knee element opposite the first leg. The rigid detent element projects towards and into the retention cavity in a rest position of the knee element. The detent element is configured to engage the fastening dart of the auxiliary device to retain the auxiliary device in position when the fastening dart is inserted into the retention cavity. The knee element flexes and moves to enable movement of the detent element during installation or extraction of the fastening dart relative to the retention cavity.

Other objects and features will be in part apparent and in part pointed out hereinafter.

BRIEF DESCRIPTION OF THE DRAWINGS

Various additional features and advantages will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments and, together with the general description given above and the detailed description given below, serve to explain the one or more embodiments. Like reference numerals indicate corresponding parts throughout the several views of the drawings.

DETAILED DESCRIPTION

Figure 1:
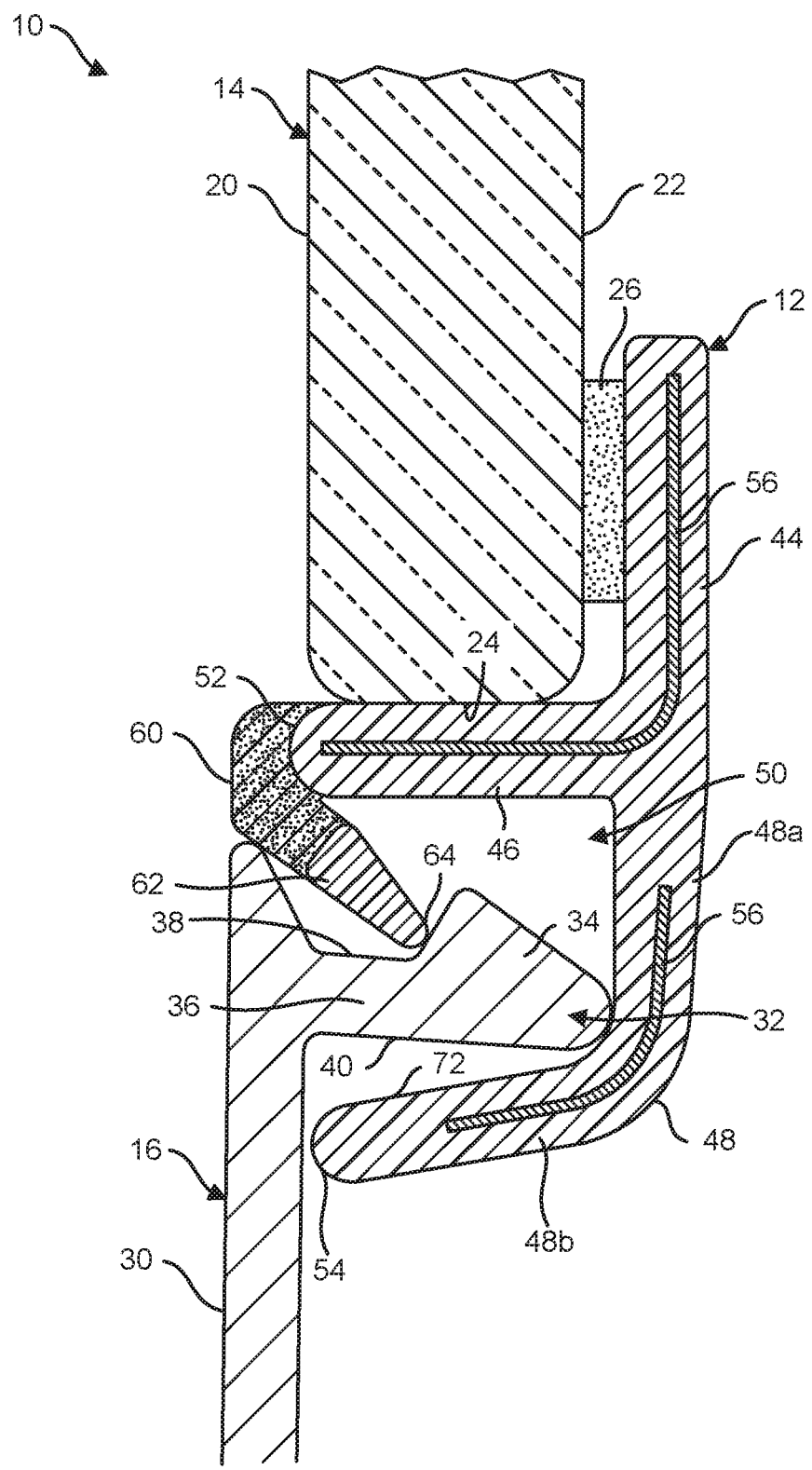
FIG. 1 is a side cross-sectional view of an assembly of a vehicle window pane and an auxiliary device (in the form of a water drain box cover) using a profile element in accordance with one embodiment, with the assembly shown in the fully installed position.

Various embodiments of an assembly joining together a vehicle window pane with an auxiliary device such as an AIP/cowl panel or a water drain box cover are provided in the Figures and in the associated description of FIGS. 1 through 21. The fastening of these elements is conducted using a molded or extruded profile element that extends longitudinally along one or more edges of the window pane, thereby enabling connection, removal, and reconnection of the elements being joined. Advantageously, the profile element is designed such that a relatively low insertion force is required to assemble the auxiliary device to the window pane, but a rigid detent that locks the auxiliary device in the assembled position provides an audible and tactile snap upon proper assembly of the elements to let an assembly personnel know the parts are properly joined. Additionally, the insertion and extraction forces needed to assemble and disassemble the parts from one another are within acceptable ranges for workers in this field (generally set by local regulations). However, the profile element is also designed to allow for some lateral movement of the auxiliary device to avoid undesirable disengagements that may otherwise be caused by thermal expansion or vibrations experienced during use of the vehicle. Therefore, the profile element and the various embodiments of the assembly described herein provide improved functionality over conventional designs.

Turning with reference to FIGS. 1 through 3B, a vehicle assembly 10 using a profile element 12 is shown in accordance with one embodiment. The profile element 12 connects together a vehicle window pane 14 and an auxiliary device 16, which may include various elements that are typically connected to one or more edges of the window pane 14. For example, the auxiliary device 16 may include a water drain box cover for removing water rolling off the window pane 14 in some embodiments, and the auxiliary device 16 may include an automotive AIP/cowl panel (or some other panel or cover) in other embodiments consistent with the scope of this invention. Regardless of the auxiliary device 16 to be connected to the window pane 14, the profile element 12 reliably maintains connection of these elements until a user applies intentional extraction forces to disassemble the assembly 10. Although several portions of the profile element 12 can be redesigned in other embodiments, including the ones summarized below in the description of FIGS. 4 through 21, the core elements of the profile element 12 and the general operation of all embodiments is now provided in detail with continued references to FIGS. 1 through 3B.

Although shown schematically in this set of Figures, the window pane 14 is well understood to be a windshield formed from composite glass or a similar material. The window pane 14 includes an outer surface 20 that generally faces the exterior of the vehicle, an inner surface 22 that faces opposite the outer surface 20, and a terminal edge 24 extending between the outer and inner surfaces 20, 22. In this embodiment of the assembly 10, the profile element 12 is connected to the window pane 14 in such a manner that the profile element 12 abuts the terminal edge 24 while being secured to the inner surface 22 using an adhesive tape 26 or a similar securing element. It will be understood that the adhesive tape 26 may be repositioned in other embodiments without departing from the scope of this invention. However, the profile element 12 is secured to the window pane 14 in a manner that is not designed to be removable under normal operation circumstances.

Likewise, these Figures illustrate only an uppermost portion of the auxiliary device 16, which is typically formed from plastic or another generally rigid material regardless of whichever type of device is needed for connection to the window pane 14. The auxiliary device 16 includes a body panel 30 that is configured to be generally aligned with and positioned below the window pane 14, and a fastening dart 32 that projects inwardly from the body panel 30 as shown. The fastening dart 32 includes an enlarged dart head 34 connected to the body panel 30 with a narrowed neck portion 36. The body panel 30 and the dart head 34 therefore delimit or define a latch groove 38 between them adjacent the neck portion 36. In the embodiment shown, the latch groove 38 is provided only along one side (a top side) of the fastening dart 32 (and therefore the fastening dart 32 includes a generally planar bottom side 40 extending perpendicular to the body panel 30), but the specific design and positioning of the groove 38 can be modified in other embodiments. All profiles of the fastening dart 32 are angled with rounded corners, so as to enable the desired interaction with a detent element of the profile element 12 described further below. It will be understood that the particular angles of the surfaces of the fastening dart 32 may be modified in other embodiments as well.

As initially described above, what pulls the elements defining the assembly 10 into a connected package is the profile element 12, which is an elongated molded piece in this and other embodiments. To this end, the cross section of the profile element 12 shown in this embodiment remains generally consistent along the elongate length (which is in and out of the page in the views shown in the Figures), and the elongate length is varied to match the desired portion(s) of the window pane 14 requiring connection to an auxiliary device 16. The portions of the profile element 12 are generally formed by molding together three different types of material, each of which is shown with different cross hatching in the Figures: a rigid polymer material, a flexible polymer material, and metallic reinforcements. For example, some of the materials used in the profile element 12 can include, but are not limited to, polypropylene, polyvinylchloride, ABS copolymers, elastomeric materials such as rubber, aluminum, steel, etc. In normal operating circumstances, the rigid polymer material and the metallic reinforcements are not designed to deflect or be resilient, while the flexible polymer material is designed for such a purpose. The use of these different types of materials in the locations shown on the profile element 12 enables the advantageous functionality and benefits described throughout this disclosure.

The profile element 12 of this embodiment is shown in further detail in FIG. 1. To this end, the profile element 12 includes a base 44 that extends generally parallel to the window pane 14 when assembled, a first leg 46 extending from one end of the base 44, and a second leg 48 also extending from the same one end of the base 44 (the bottom end as shown in FIGS. 1 through 3B). The first and second legs 46, 48 collectively define a generally U-shaped structure that provides a retention cavity 50 for receiving the fastening dart 32. The first leg 46 extends generally perpendicular to the base 44 in this embodiment and terminates at a leading end 52. The first leg 46 extends along and abuts the terminal edge 24 of the window pane 14 when the base 44 is adhered to the inner surface 22 as shown. The second leg 48 extends in an L-shaped direction with a first portion 48a extending in the same direction as the base 44 and a second portion 48b extending at a non-perpendicular angle to the first portion 48a, but generally in the same direction as the first leg 46. The second portion 48b includes a leading end 54 as well. The angle measured between the first and second portions 48a, 48b is an obtuse angle such that the second portion 48b spreads slightly away from the first leg 46 as both these elements extend to their respective leading ends 52, 54. As shown by the cross hatching in FIG. 1, the base 44 and first and second legs 46, 48 are formed from the rigid polymer material with metallic strips 56 molded inside the rigid polymer material to add stiffness and strength to these elements. In the particular example shown in this embodiment, one metallic strip 56 extends in an L-shaped manner within the base 44 and the first leg 46, while another metallic strip 56 extends in an L-shaped manner within the second leg 48. However, different configurations of the metallic reinforcements within the mold are possible in other embodiments.

At the leading end 52 of the first leg 46 in the profile element 12, a resilient knee element 60 (may also be referred to as a hinge element) is connected to the first leg 46. The resilient knee element 60 is formed from the flexible polymer material as set forth above. To this end, the resilient knee element 60 is capable of resilient movement and compression/extension while acting as a seal element adjacent the terminal edge 24 of the window pane 14. The resilient knee element 60 extends between the leading end 52 of first leg 46 and a rigid detent element 62. The detent element 62 is formed from one or more of the rigid polymer materials in this embodiment, and has a generally triangular cross section that tapers to a rounded nose 64 on a free end opposite the connection to the knee element 60 as shown in FIG. 1. It will be understood that the shape and size of the detent element 62 could be varied in other embodiments. The knee element 60 is preferably firmly bonded to each of the detent element 62 and the first leg 46, but it will be appreciated that these elements may also be integrally formed (such as by an extrusion process) or otherwise connected during the molding process. In the relaxed position of the knee element 60 shown in FIG. 2A, the knee element 60 curves around in a U-shape such that the rounded nose 64 of the detent element 62 projects inwardly into a portion of the retention cavity 50. To this end, an opening 66 into the interior of the retention cavity 50 is normally defined in the gap between the detent element 62 and the second portion 48b of second leg 48.

Figure 2A:
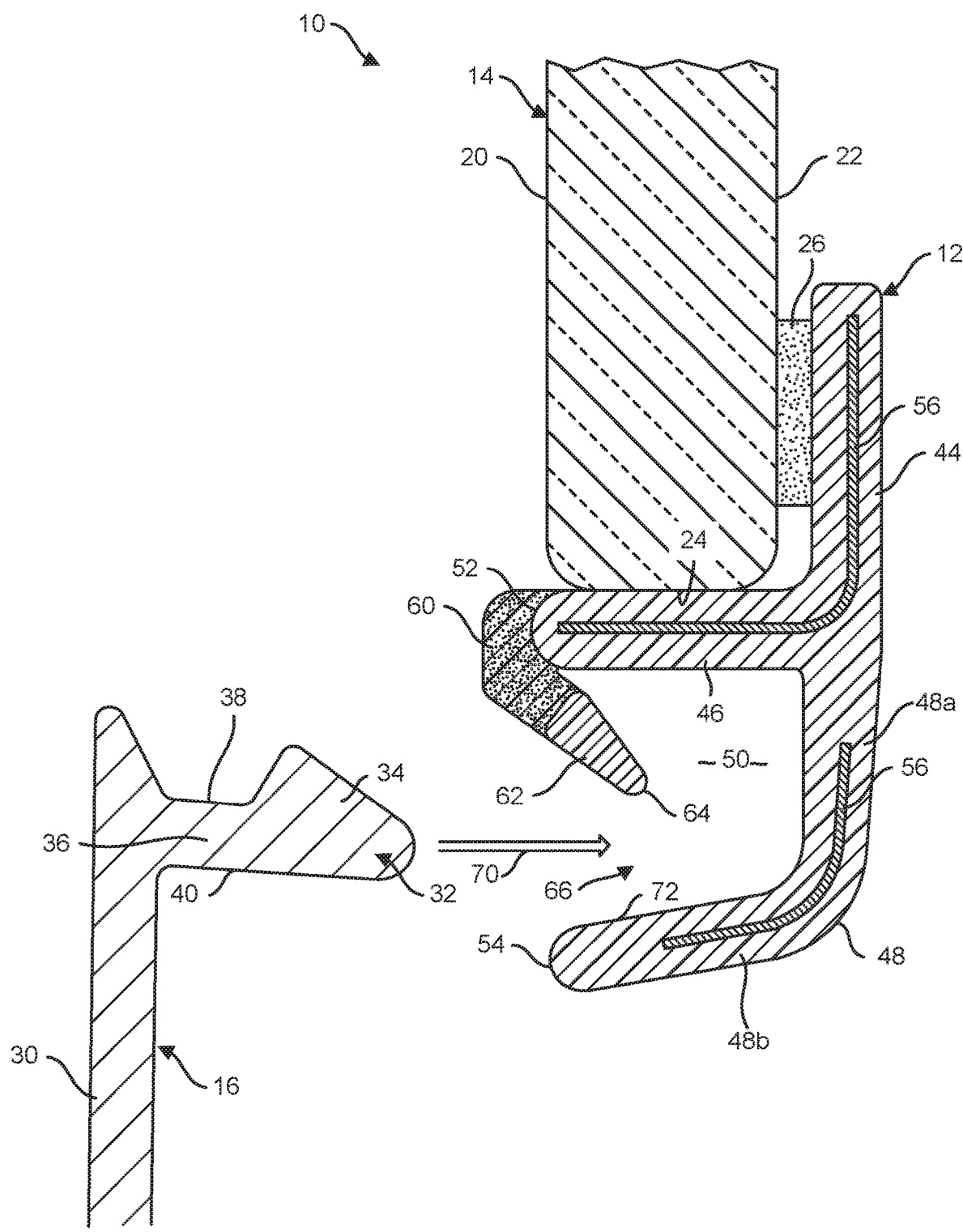
FIG. 2A is a side cross-sectional view of the assembly of FIG. 1 in a first position during installation of the auxiliary device, with a fastening dart on the auxiliary device separated from a retention cavity defined by the profile element.

With reference to FIGS. 2A through 3B, the assembly and disassembly process for connecting the auxiliary device 16 to the window pane 14 with the profile element 12 is shown. In FIG. 2A, the profile element 12 is shown secured to the window pane 14, as would be the case when an assembly or maintenance worker were ready to install the auxiliary device 16 on the vehicle. The knee element 60 is in a relaxed state and the detent element 62 projects into the retention cavity 50. The fastening dart 32 on the auxiliary device 16 would be aligned with the opening 66 into the retention cavity 50 as shown, and then the worker would move the fastening dart 32 towards the retention cavity 50 in the direction shown by arrow 70. If the fastening dart 32 is slightly misaligned with the retention cavity 50, the angling of the second leg 48 provides a guiding profile 72 to push these elements into alignment as the insertion continues along the direction of arrow 70.

Figure 2B:
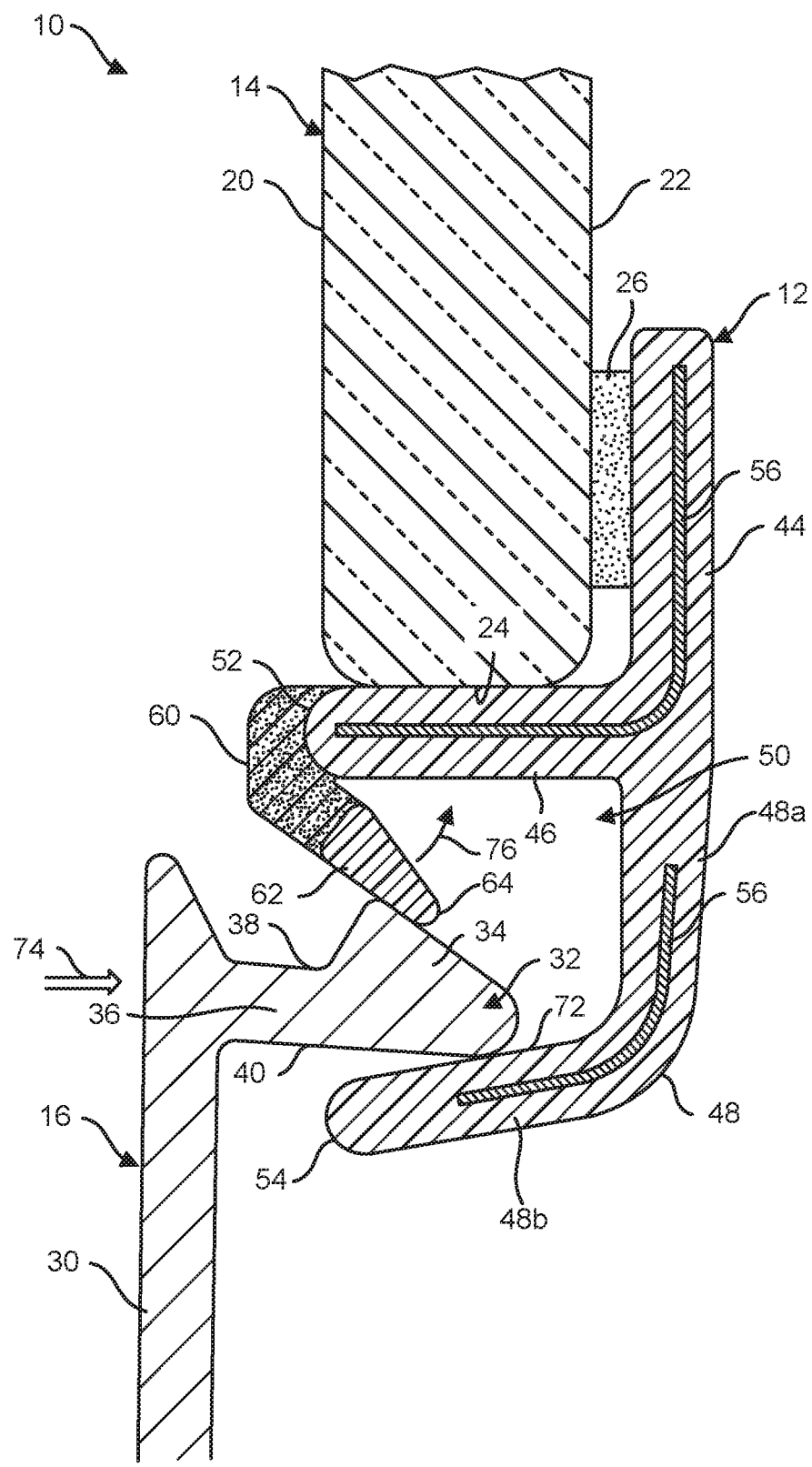
FIG. 2B is a side cross-sectional view of the assembly of FIG. 2A in a second position during installation of the auxiliary device, with the fastening dart engaging a detent element to deflect the detent element out of the movement path of the fastening dart as it enters the retention cavity.

In FIG. 2B, the dart head 34 of fastening dart 32 has been pushed towards the retention cavity 50 sufficiently enough to cause the opposing sides of the dart head 34 to come into abutting and sliding contact with the detent element 62 and the guiding profile 72 of the second leg 48. Because the second leg 48 is formed from rigid polymer material, the movement of the fastening dart 32 along arrow 74 in FIG. 2B forces the detent element 62 to rotate upwardly towards the first leg 46 as shown by arrow 76 in FIG. 2B. As described above, the rigid polymer is not designed to deflect or be resilient. To this end, the knee element 60 stretches/compresses and deflects to allow the detent element 62 to move out of the movement path of the expanding cross section of the dart head 34. The second leg 48 does not deflect relative to the first leg 46 during this movement. The rounded nose 64 on the detent element 62 effectively drags along a top side of the dart head 34 to move the detent element 62 upwardly in the retention cavity 50, leading to the fully deflected position shown in FIG. 2C. Once again, there is sufficient spacing or clearance formed between the second portion 48b of second leg 48 and the first leg 46 to avoid having the rigid elements within the retention cavity 50 (e.g., the detent element 62 and the dart head 34) force a deflection of the second leg 48 away from the first leg 46. The second leg 48 advantageously remains stationary or fixed relative to the remainder of the profile element 12.

Figure 2C:
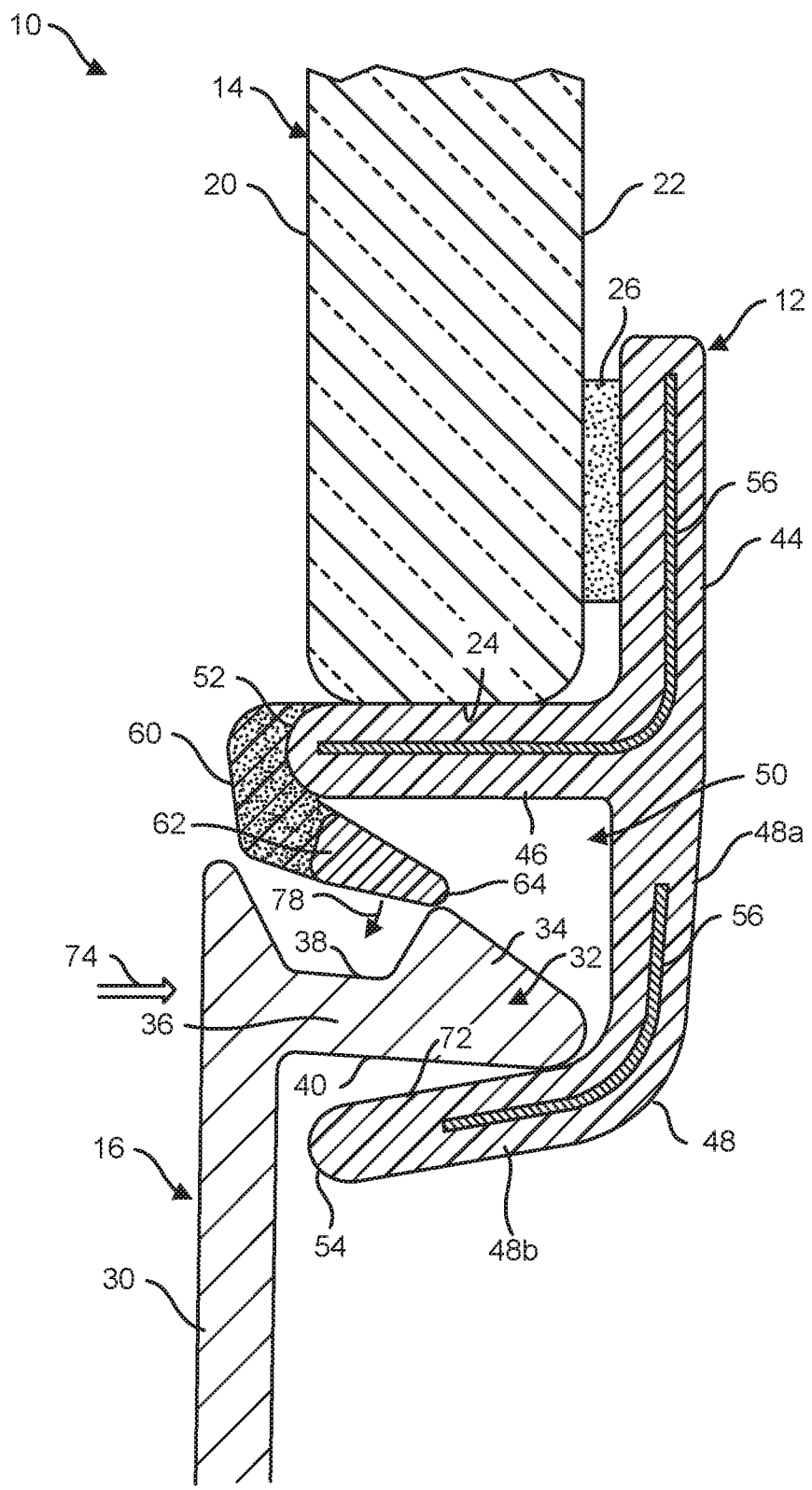
FIG. 2C is a side cross-sectional view of the assembly of FIG. 2B in a third position during installation of the auxiliary device, with the detent element further deflected by the fastening dart during further movement into the retention cavity.

As the fastening dart 32 continues to move in the insertion direction shown by arrow 74 in FIGS. 2B and 2C, the rounded nose 64 of the detent element 62 eventually slides past the dart head 34 and into the latch groove 38 formed at the neck portion 36 of the fastening dart 32. As the knee element 60 has been deflected into this position, the resilience of the knee element 60 will then snap the detent element 62 back downwardly as shown by arrow 78 in FIG. 2C towards the neck portion 36, which is closer to the rest position of the knee element 60. That movement results in the detent element 62 snapping into a latched and locked position at the latch groove 38 as shown in the fully assembled state of FIG. 2D. The knee element 60 may be configured to contact an upper end of the body panel 30 of the auxiliary device 16 in this position to enable the sealing effect initially described above. In any event, the engagement of the rigid detent element 62 and the latch groove 38 on the fastening dart 32 secures together the auxiliary device 16 with the profile element 12 and the window pane 14, thereby forming the assembly 10.

Figure 2D:
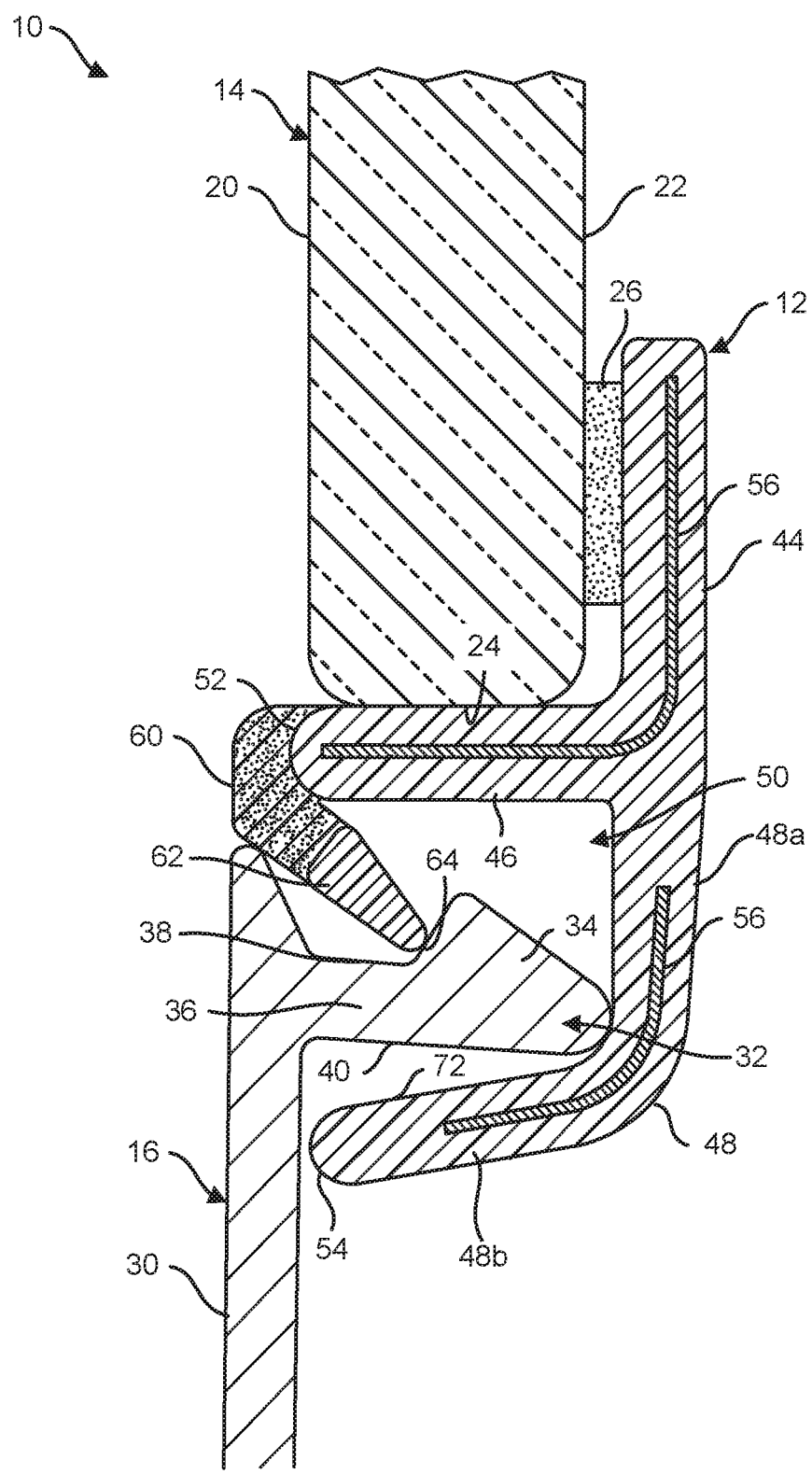
FIG. 2D is a side cross-sectional view of the assembly of FIG. 2C in a fourth position during installation of the auxiliary device, with the fastening dart fully inserted into the retention cavity and the detent element latched into a groove on the fastening dart.

The so-called snapping movement of the detent element 62 between the positions shown in FIGS. 2C and 2D is evident in an audible manner as well as a tactile manner for the worker. To this end, the quick movement and engagement of the rigid detent element 62 with another rigid element at the neck portion 36 produces a significant audible click or snap sound that can be discerned by the worker. Likewise, this snapping movement can also be felt when holding the body panel 30 of the auxiliary device 16.

Accordingly, the worker is notified with both the audible snap noise and the tactile snap feeling that the assembly 10 is properly connected together at this stage of the assembly. Moreover, there is no need for the worker to disassemble and reassemble these components to confirm that a proper connection between them has been established. The relatively small amount of deflection and movement of the knee element 60 during the insertion process shown in FIGS. 2A through 2D allows for a relatively small insertion force to be applied to effect this connection of the assembly 10, which is desirable as noted above. Likewise, the second leg 48 does not need to be forced to move or deflect by this insertion force as a result of the design of profile element 12.

Figure 3A:
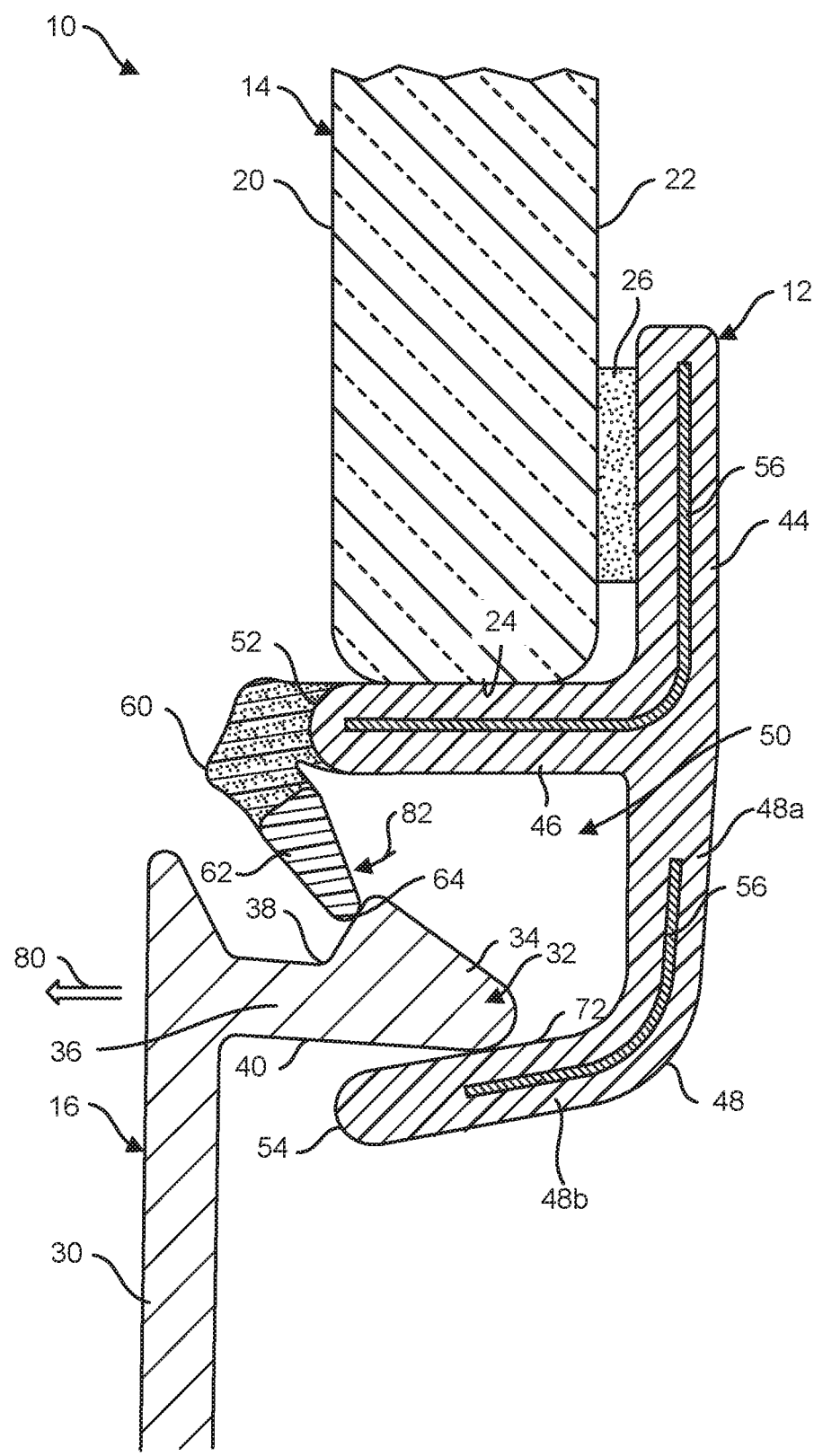
FIG. 3A is a side cross-sectional view of the assembly of FIG. 2D in a first position during removal of the auxiliary device, with the fastening dart deflecting the detent element in an opposite direction of the deflection caused during installation.
Figure 3B:
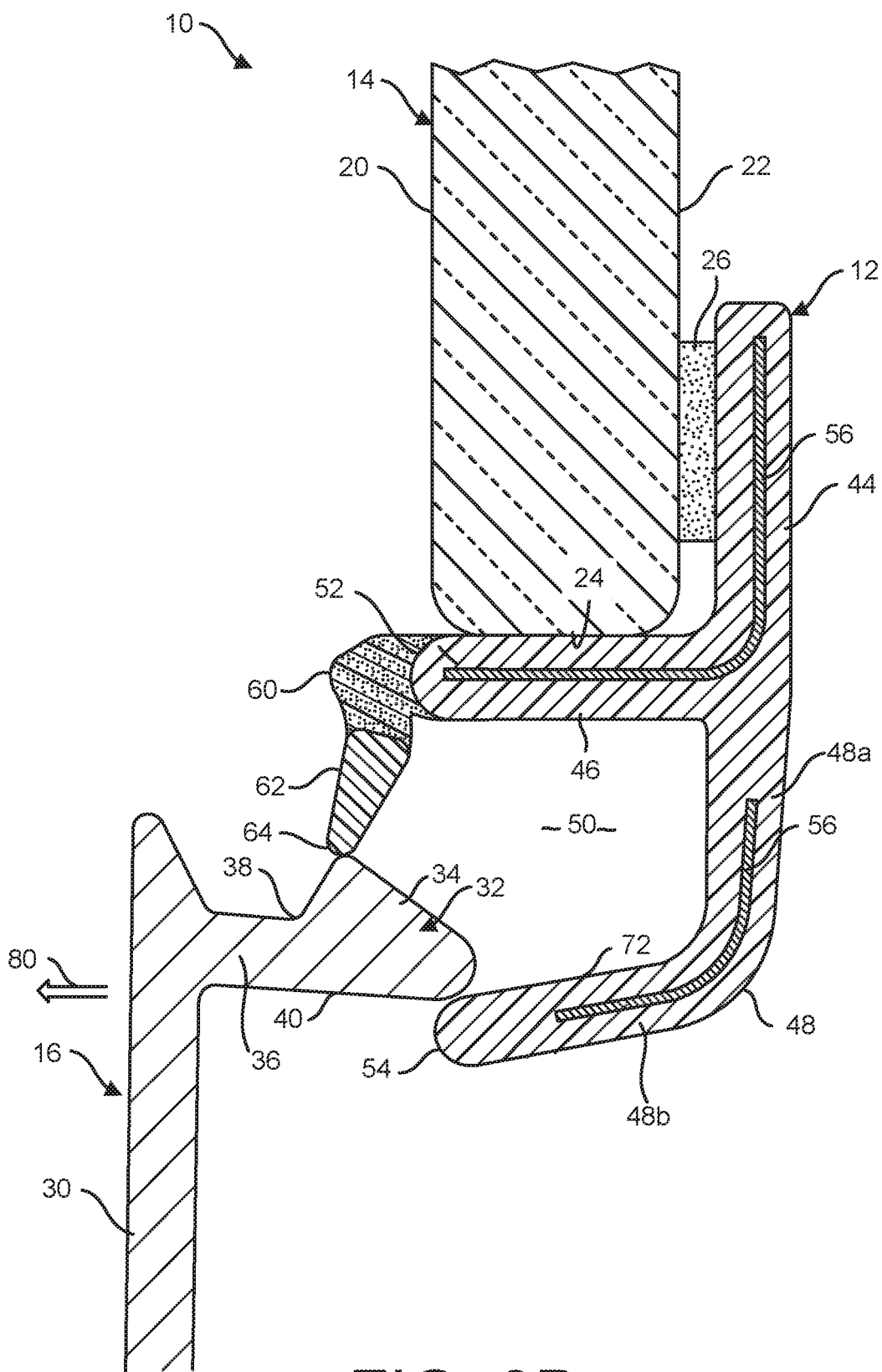
FIG. 3B is a side cross-sectional view of the assembly of FIG. 3A in a second position during removal of the auxiliary device, with the detent element further deflected by the fastening dart as the fastening dart is removed from the retention cavity.

The disassembly process is largely a reverse of the actions described above, and this process is shown in FIGS. 2D through 3B. Starting from the fully assembled position in FIG. 2D, the worker pulls on the auxiliary device 16 at the body panel 30 to apply extraction force to withdraw the fastening dart 32 from the retention cavity 50. This movement, in the direction of arrow 80 in FIG. 3A, forces the detent element 62 to rotate outwardly in an opposite direction of the deflection generated during insertion of the fastening dart 32, and this rotation or movement outwardly is shown in FIG. 3A at arrow 82. The knee element 60 is forced to compress and move to allow for this outward movement and rotation of the detent element 62. After the movement of the fastening dart 32 has forced the rounded nose 64 of the detent element 62 to rotate as far as it can within the latch groove 38 and back into sliding engagement with the dart head 34, the detent element 62 slides up the surface of the dart head 34 until the largest portion of the dart head 34 passes by the detent element 62, which is what is shown in FIG. 3B. The compression and deflection of the knee element 60 is designed to be at its greatest extent in this position, which causes the extraction force that must be applied by a worker to be significantly more than the insertion force used to position the fastening dart 32 into the retention cavity 50. With continued movement of the auxiliary device 16 in the direction of arrow 80 from the position shown in FIG. 3B, the detent element 62 moves past the dart head 34 and snaps back to the rest position projecting into the retention cavity 50 as previously shown and described with reference to FIG. 2A. The auxiliary device 16 is free from engagement with the assembly 10 and can be repaired or replaced as needed.

During the withdrawal of the fastening dart 32 from the retention cavity 50, the planar bottom side 40 of the dart head 34 slides along the guiding profile 72 on the second leg 48 of the profile element 12. This sliding movement does not cause deflection of the second leg 48 away from the first leg 46, which would add a wear factor to the profile element 12. To this end, the removal of the fastening dart 32 causes only a deflection and movement of the detent element 62 and the resilient knee element 60 that the detent element 62 is connected to. This configuration and the materials chosen for the knee element 60 allow the insertion and extraction forces to be tailored to the needs of the end customer and workers.

For example, lab testing of the profile element 12 shown in this embodiment has provided an exemplary set of forces and deflections during normal installation and extraction of the auxiliary device 16 from the assembly 10. The insertion forces, in one example, can be in the range of about 2.0 N to about 4.0 N, for example about 2.0 N, while the extraction forces can be between about 10.0 N and 13.0 N. Thus, as noted above, the extraction forces are significantly higher than the insertion forces so as to make it very easy to assemble the assembly 10 while providing confidence that the auxiliary device 16 will not be unintentionally dislodged during use on the vehicle. The deflection of the second leg 48 at the leading end 54 thereof relative to the window pane 14 was also measured, and the test results confirm that no deflection or movement of the second leg 48 occurs during insertion or extraction. Consequently, the profile elements described herein define fewer failure modes and points than the complex designs of the conventional art described above. As noted above, the audible and tactile snap produced during insertion of the fastening dart 32 into the retention cavity 50 is also desirable for workers producing the assembly 10.

In summary, the profile element 12 of this and other embodiments of this invention reliably secures together an auxiliary device 16 and a window pane 14 when such connection is desired. One additional feature of such a design is that the auxiliary device 16 is capable of small lateral movements (e.g., along the longitudinal length of the profile element 12 into and out of the page as shown in the Figures) when necessary to account for thermal expansion stresses and vibrations applied during vehicle operation. To this end, the locking engagement of the detent element 62 and the latch groove 38 of the fastening dart 32 is a rigid material-on-rigid material engagement (only rigid contact points are made with the fastening dart 32), so there is no significant prevention of lateral movements if these are caused by excessive vibrations of the body panel 30 via the vehicle. These small lateral movements avoid applying excess stress to the profile element 12 or the components thereof, and that further helps to avoid any unintentional dislodgement or release of the fastening dart 32 and the body panel 30 from the assembly 10. Therefore, the design of the profile element 12 assures reliable connection of the parts shown.

Further embodiments consistent with the invention are shown in FIGS. 4 through 21, and these embodiments function in much the same manner as the first embodiment described above. Accordingly, focus in the paragraphs below will be on the differences of these embodiments. Furthermore, similar reference numbers from previous embodiment(s) will be used without further explanation in the Figures for these embodiments where the components are essentially unchanged from that described in detail above. Each of these embodiments provides similar beneficial functionality as described above when assembling an auxiliary device 16 to a window pane 14, those elements being shown in phantom in certain of FIGS. 4 through 21.

Figure 4:
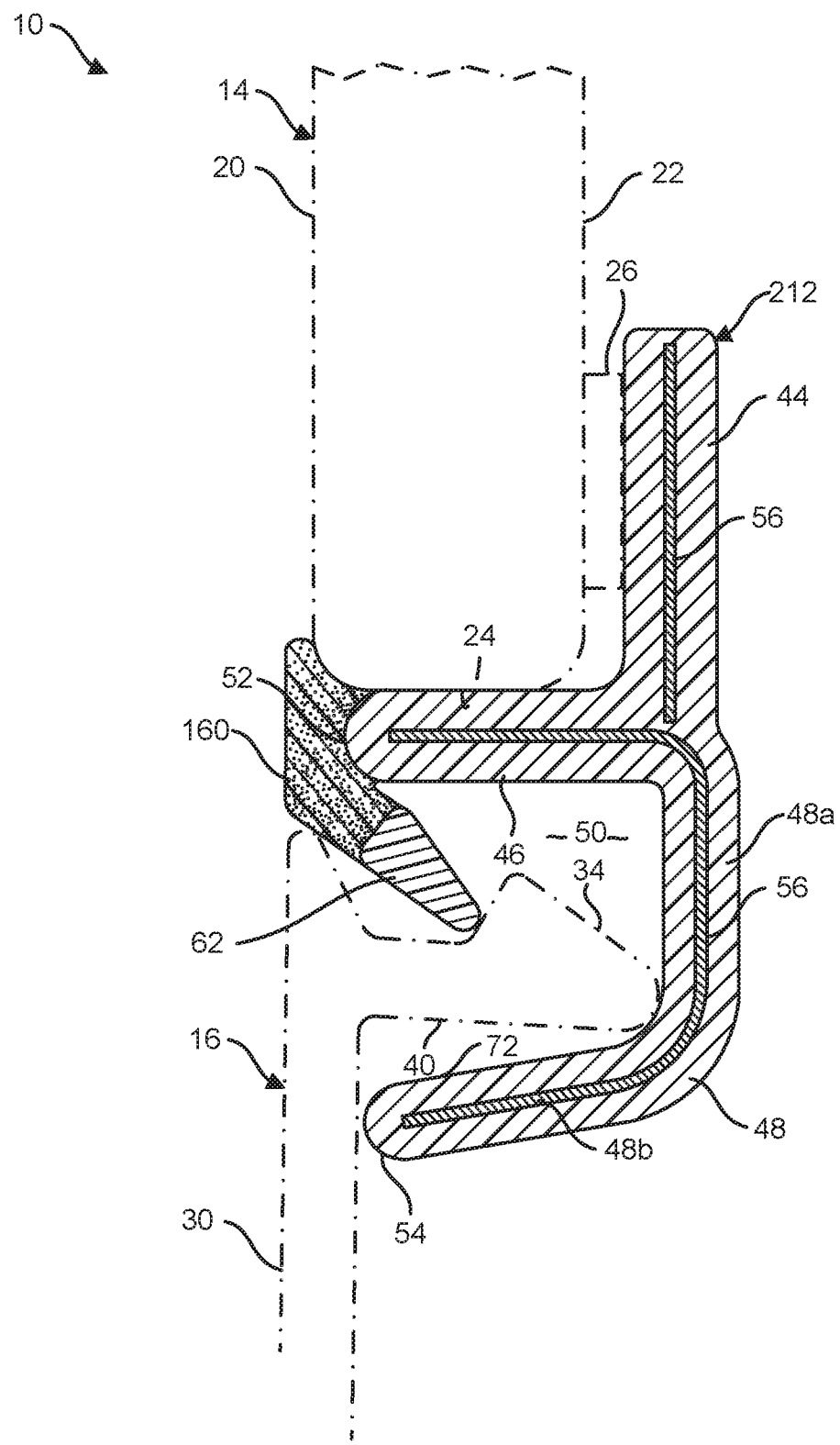
FIG. 4 is a side cross-sectional view of an assembly of a vehicle window pane and an auxiliary device using a profile element in accordance with another embodiment, defining an over-flush seal design.

Beginning with FIG. 4, another embodiment of the profile element 112 is shown in the fully assembled position with an auxiliary device 16 and a window pane 14. The profile element 112 of this embodiment differs from the embodiment of FIG. 1 in a few aspects. First, the second leg 48 of the profile element 112 is slightly offset from the base 44 at the junction of these elements and the first leg 46, and the first portion 48a of the second leg 48 is therefore extending parallel to the base 44 rather than extending directly in line with the base 44. The metallic strips 56 are modified such that one is a U-shaped reinforcement in the first and second legs 46, 48, while another is a reinforcement in the base 44. The resilient knee element 160 is also modified in this embodiment to define an over-flush seal design that extends around the terminal edge 24 of the window pane 14 and over a small portion of the outer surface 20. In all other respects, including assembly and disassembly operation and materials, the profile element 112 of the FIG. 4 embodiment is the same as the embodiment described previously. Therefore, the profile element 112 is configured to enable reliable connection of the auxiliary device 16 and the window pane 14.

Figure 5:
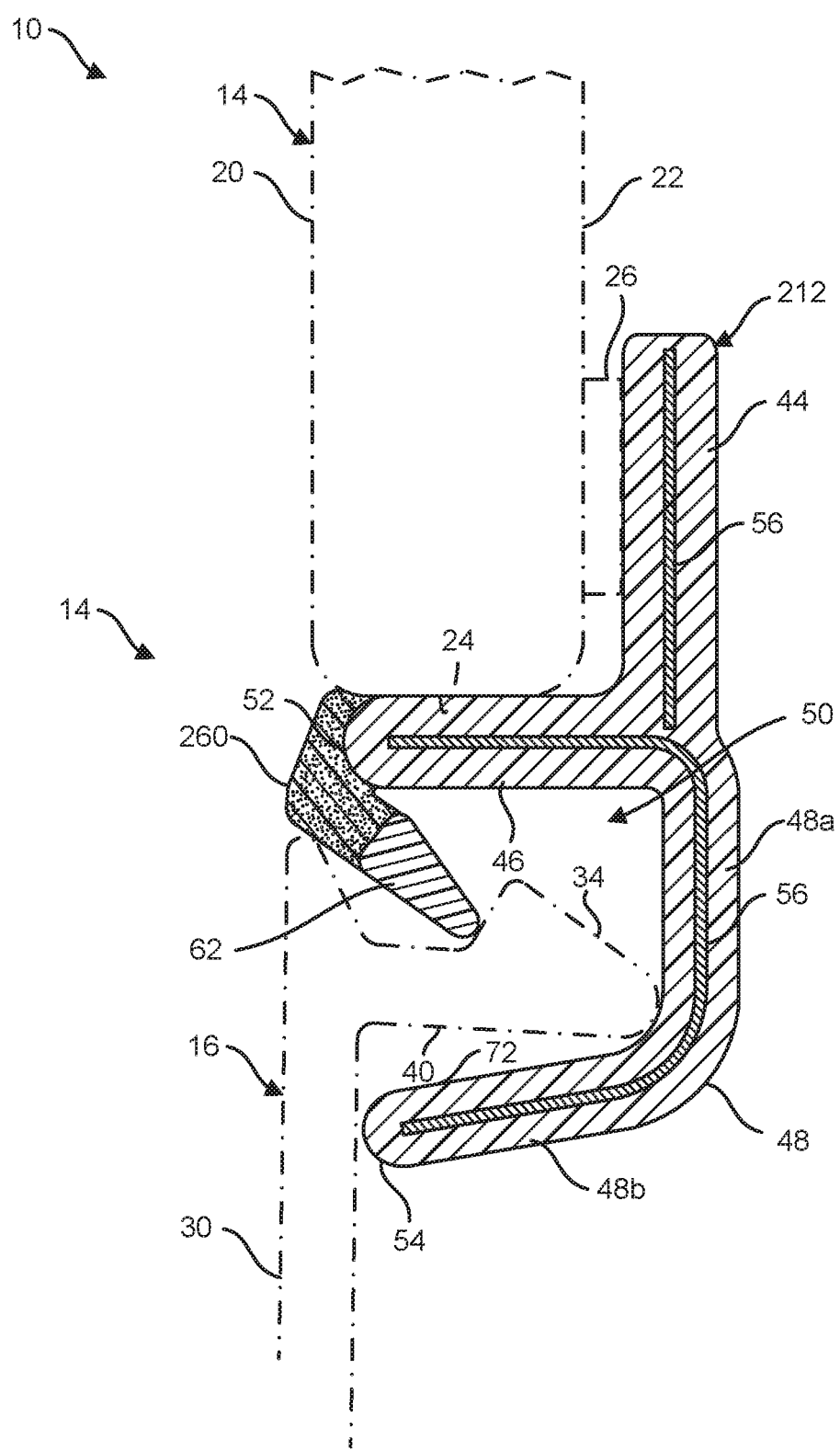
FIG. 5 is a side cross-sectional view of an assembly of a vehicle window pane and an auxiliary device using a profile element in accordance with another embodiment, defining an under-flush seal design.

Turning to FIG. 5, another embodiment of the profile element 212 is shown in the fully assembled position with an auxiliary device 16 and a window pane 14. The profile element 212 of this embodiment is largely similar to the embodiment shown in FIG. 4, such as by including the parallel base 44 and first portion 48*a* of the second leg 48. The resilient knee element 260 is further modified to define an under-flush seal design that extends only along a portion of the terminal edge 24 of the window pane 14 after installation. Nevertheless, the knee element 260 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. In all other respects, including functionality and materials, the profile element 212 of the FIG. 5 embodiment is the same as the embodiment described previously, and therefore is configured to enable reliable connection of the auxiliary device 16 and the window pane 14.

Figure 6A:
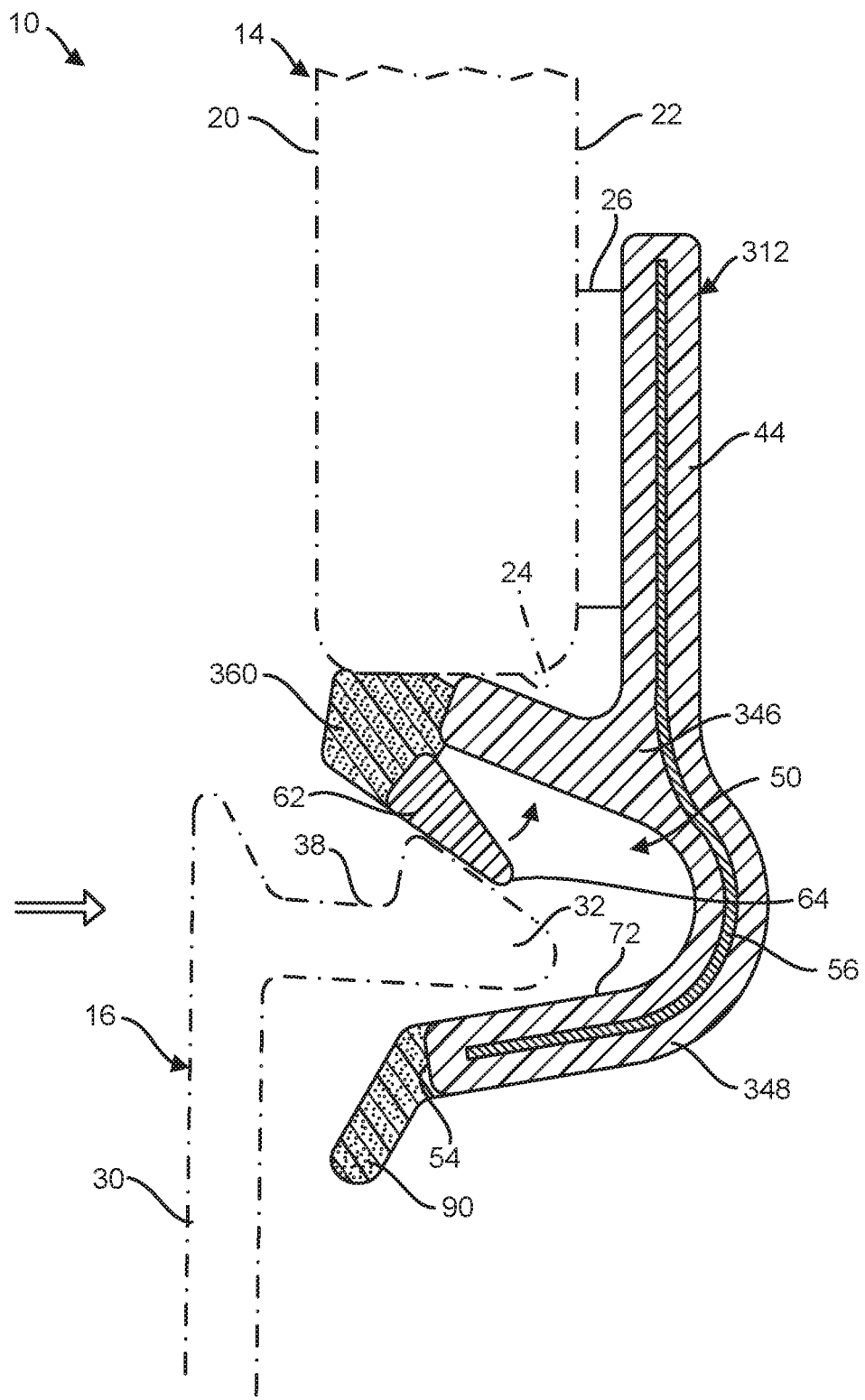
FIG. 6A is a side cross-sectional view of an assembly of a vehicle window pane and an auxiliary device using a profile element in accordance with another embodiment, defining an under-flush seal design with an elongated cushion added for the auxiliary device, and the assembly shown during assembly of the parts.
Figure 6B:
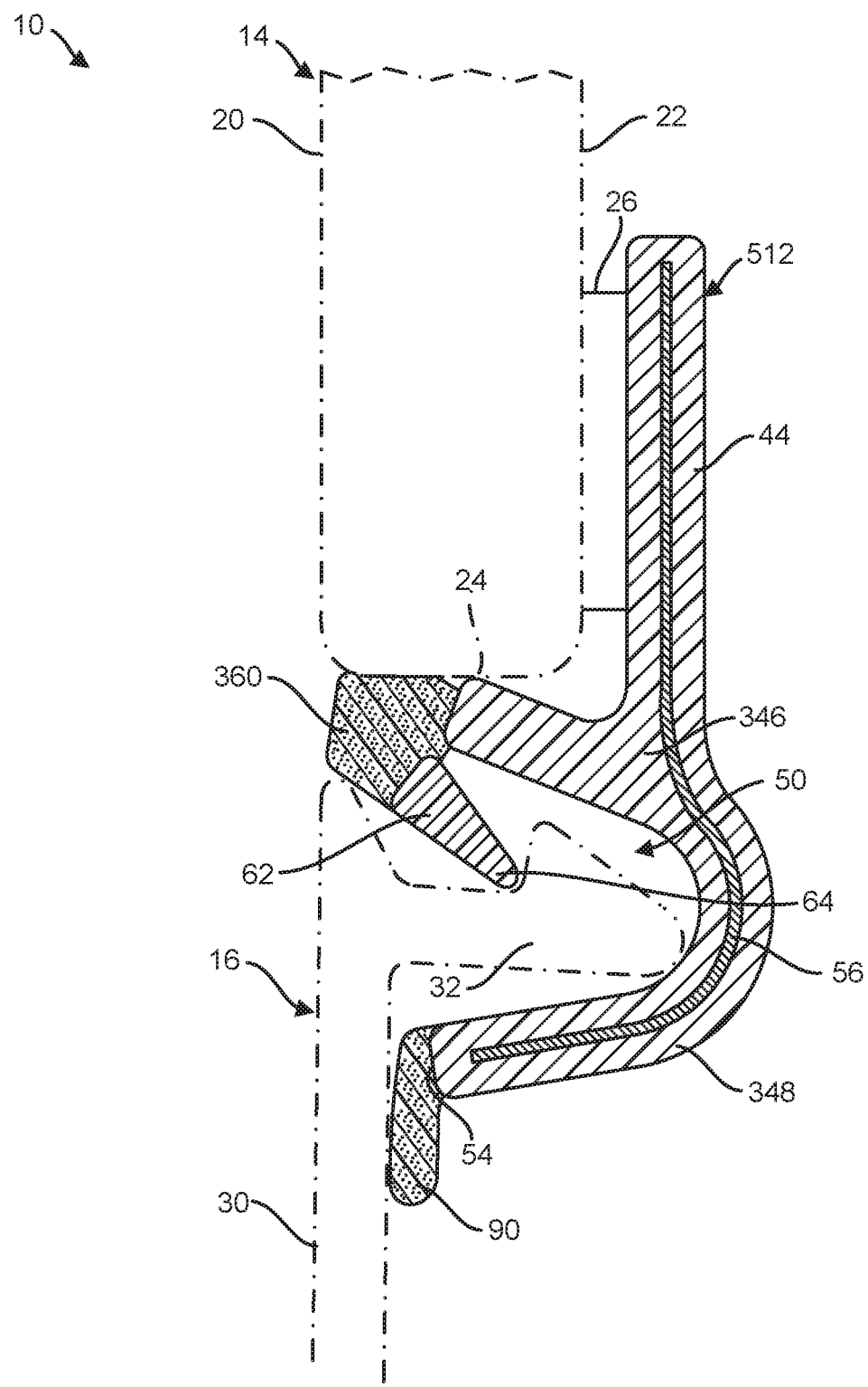
FIG. 6B is a side cross-sectional view of the assembly of FIG. 6A, with the assembly shown fully engaged and stabilized.

Now referring to FIGS. 6A and 6B, another embodiment of the profile element 312 is shown in the fully assembled position with an auxiliary device 16 and a window pane 14. The profile element 312 of this embodiment differs from those in previous embodiments in a few aspects. To this end, the profile element 312 includes a modified first leg 346 and second leg 348 collectively defining a rounded U-shape profile instead of a square or box-shaped U-shape profile as in previous embodiments. The second leg 348 does not include discrete portions angled from one another in this regard. The base 44 continues to connect to the first and second legs 346, 348 as before, but the metallic strip 56 is an elongated single reinforcement that extends through substantially an entirety of the base 44 and the second leg 348 (but not the first leg 346). Because the first leg 346 now extends at an angle to the terminal edge 24 of the window pane 14, the resilient knee element 360 is modified to provide a seal engagement extending along at least a portion of the terminal edge 24. The knee element 360 of this embodiment defines an under-flush or flush seal design, just like in FIGS. 1 and 5 (it will be understood that various levels of flush, over-flush, and under-flush can be used). Nevertheless, the knee element 360 continues to provide the resilient flexing that enables the rigid detent element 62 to connect with and lock the auxiliary device 16 in position at the retention cavity 50.

Another additional element included in this embodiment of the profile element 312 in FIGS. 6A and 6B is an elongated cushion 90 formed from a resilient or flexible material, which may be the same as the material defining the knee element 360 or another similar material in some embodiments. The cushion 90 extends from the leading end 54 of the second leg 348 and therefore is positioned to deflect and come into abutment with the inside of the body panel 30 of the auxiliary device 16 when the auxiliary device 16 is secured in position at the retention cavity 50. In FIG. 6A, which is a view of the profile element 312 in the middle of installation of the auxiliary device 16, the detent element 62 is again deflected out of the path of the fastening dart 32. Further movement will snap the detent element 62 into position behind the fastening dart 32 as shown in FIG. 6B, the fully assembled and stabilized position, at which point the cushion 90 is also engaged with the auxiliary device 16. The cushion 90 can provide additional prevention or dampening of vibrations that would subject the auxiliary device 16 to potential unintended dislodgement in conventional designs (but as described above, the profile element 312 of this disclosure is configured to avoid such issues). In all other respects, including functionality and materials, the profile element 312 of the FIGS. 6A and 6B embodiment is the same as the embodiments described previously, and therefore is configured to enable reliable connection of the auxiliary device 16 and the window pane 14.

Figure 7:
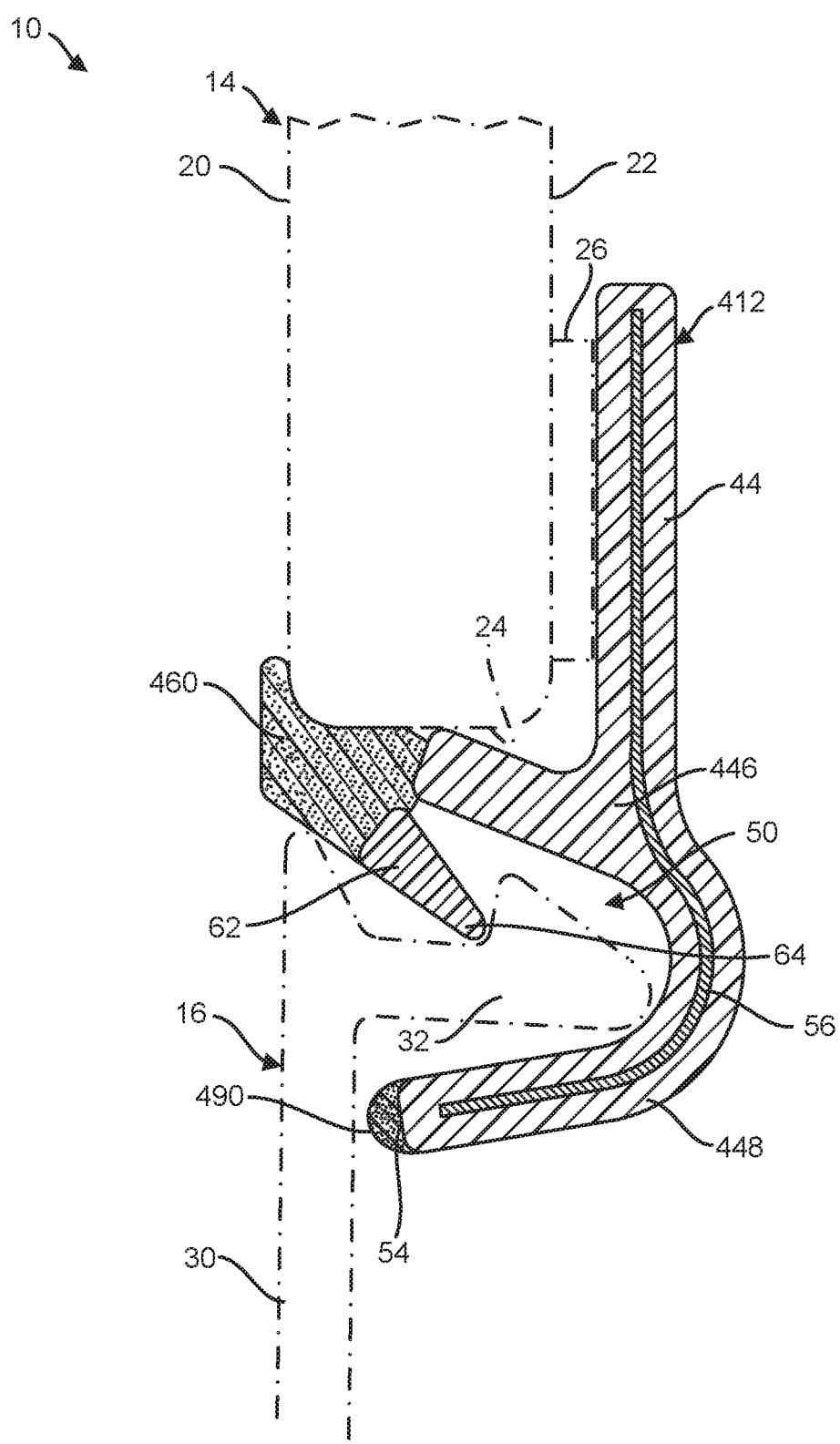
FIG. 7 is a side cross-sectional view of an assembly of a vehicle window pane and an auxiliary device using a profile element in accordance with another embodiment, defining an over-flush seal design with a small cushion added for the auxiliary device.

In FIG. 7, another embodiment of the profile element 412 is shown in the fully assembled position with an auxiliary device 16 and a window pane 14. The profile element 412 of this embodiment is largely similar to the embodiment shown in FIG. 6B, such as by including the rounded U-shaped profile at the first leg 446 and the second leg 448. The resilient knee element 460 of this embodiment is further modified to define an over-flush seal design that extends along both a portion of the terminal edge 24 of the window pane 14 and along a portion of the outer surface 20 after installation. Nevertheless, the knee element 460 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. The cushion 490 on the end of the second leg 448 is also modified to be just an end cap of resilient material adjacent to the leading end 54 rather than an elongated piece. It will be understood that the cushion 490 could be formed from a different material as well in this embodiment. The cushion 490 may not always come into contact with the body panel 30 of the auxiliary device 16 in the fully installed position, but it functions to limit significant vibrations when those may be present, as described above. In all other respects, including functionality and materials, the profile element 412 of the FIG. 7 embodiment is the same as the embodiments described previously, and therefore is configured to enable reliable connection of the auxiliary device 16 and the window pane 14.

Figure 8:
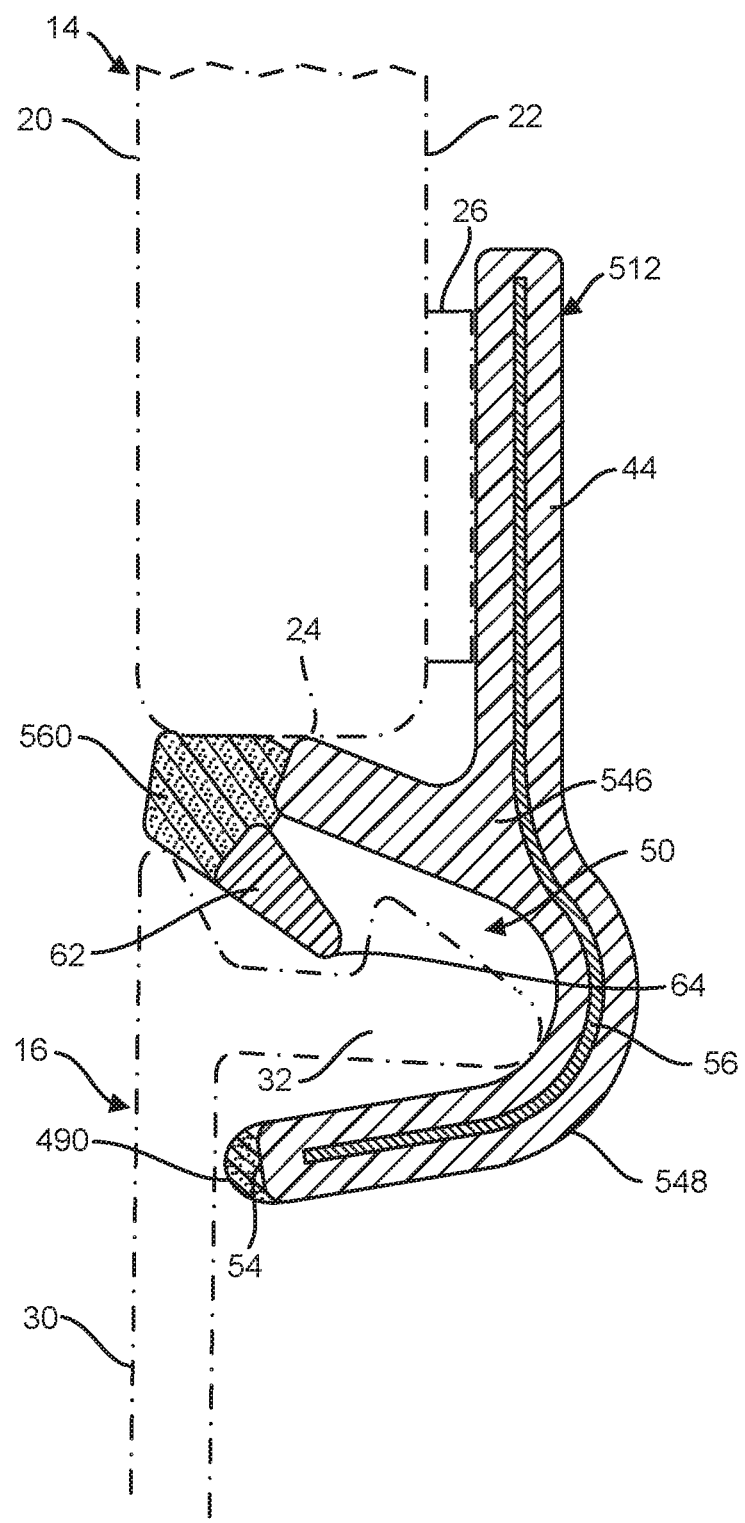
FIG. 8 is a side cross-sectional view of an assembly of a vehicle window pane and an auxiliary device using a profile element in accordance with another embodiment, defining an under-flush seal design with a small cushion added for the auxiliary device.

Now referring to FIG. 8, another embodiment of the profile element 512 is shown in the fully assembled position with an auxiliary device 16 and a window pane 14. The profile element 512 of this embodiment is largely similar to the embodiment shown in FIG. 7, such as by including the rounded U-shaped profile at the first leg 546 and the second leg 548. The resilient knee element 560 of this embodiment is further modified to define an under-flush seal design that extends along only a portion of the terminal edge 24 of the window pane 14 after installation. Nevertheless, the knee element 560 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. The cushion 490 is the same as the previous embodiment, e.g., formed as an end cap adjacent to the leading end 54 rather than an elongated piece. In all other respects, including functionality and materials, the profile element 512 of the FIG. 8 embodiment is the same as the embodiments described previously, and therefore is configured to enable reliable connection of the auxiliary device 16 and the window pane 14.

Figure 9:
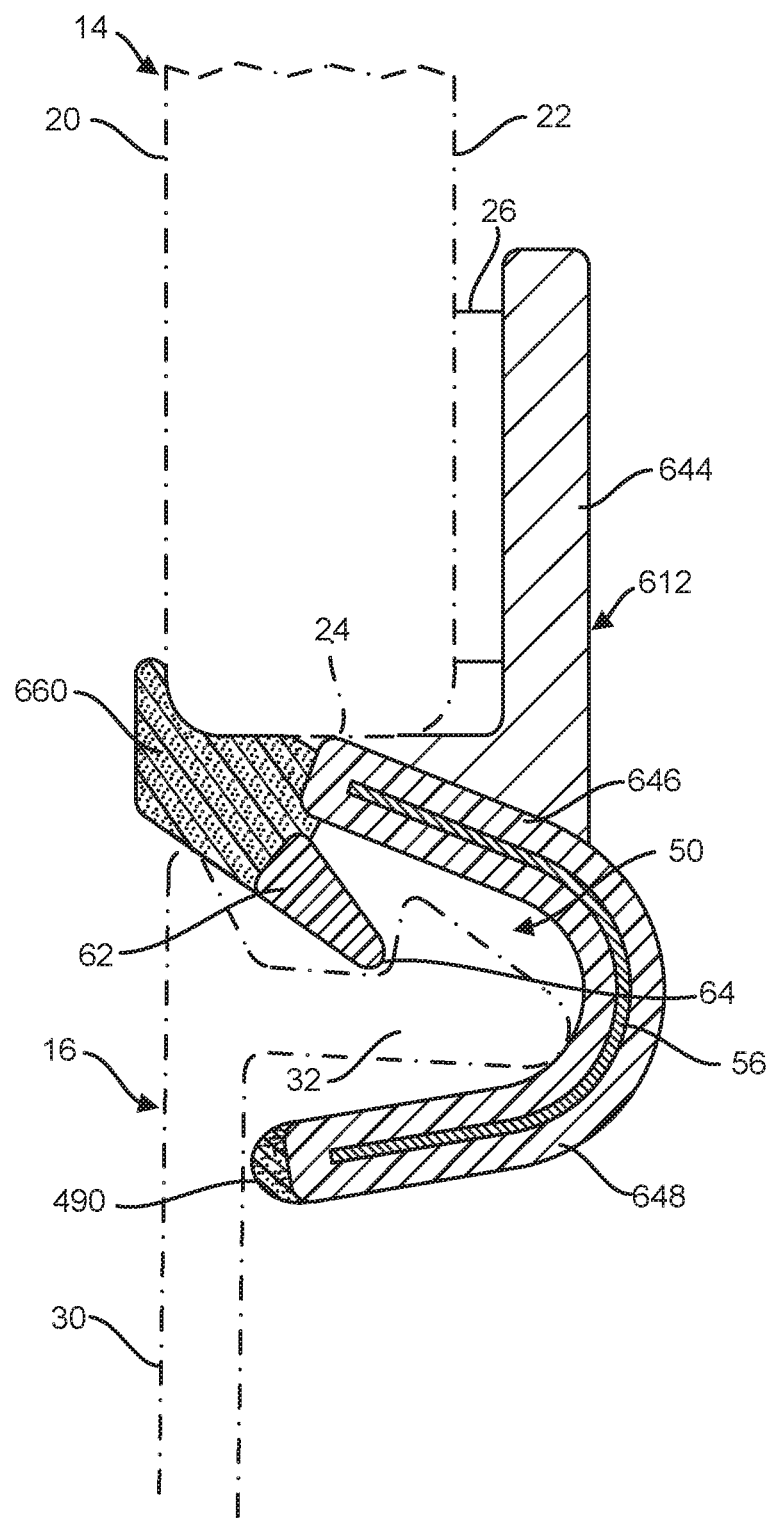
FIG. 9 is a side cross-sectional view of an assembly of a vehicle window pane and an auxiliary device using a profile element in accordance with another embodiment, defining an over-flush seal design with a small cushion added for the auxiliary device.

Turning to FIG. 9, another embodiment of the profile element 612 is shown in the fully assembled position with an auxiliary device 16 and a window pane 14. The profile element 612 of this embodiment is largely similar to the embodiment shown in FIG. 7, such as by including the rounded U-shaped profile at the first leg 646 and the second leg 648 as well as a resilient knee element 660 defining an over-flush seal design. The cushion 490 is also the same as the previous embodiments, e.g., formed as an end cap adjacent to the leading end 54 rather than an elongated piece. The profile element 612 of this embodiment differs in the following ways. The metallic strip 56 extends as a reinforcement through the first leg 646 and the second leg 648 in this embodiment, but not through the base 644. The base 644 of this embodiment is redesigned as a separate piece connected to or integrally formed with the first and second legs 646, 648, and this base 644 may be provided from a separate rigid or flexible material in this embodiment. In all other respects, including functionality and materials, the profile element 612 of the FIG. 9 embodiment is the same as the embodiments described previously, and therefore is configured to enable reliable connection of the auxiliary device 16 and the window pane 14.

Figure 10A:
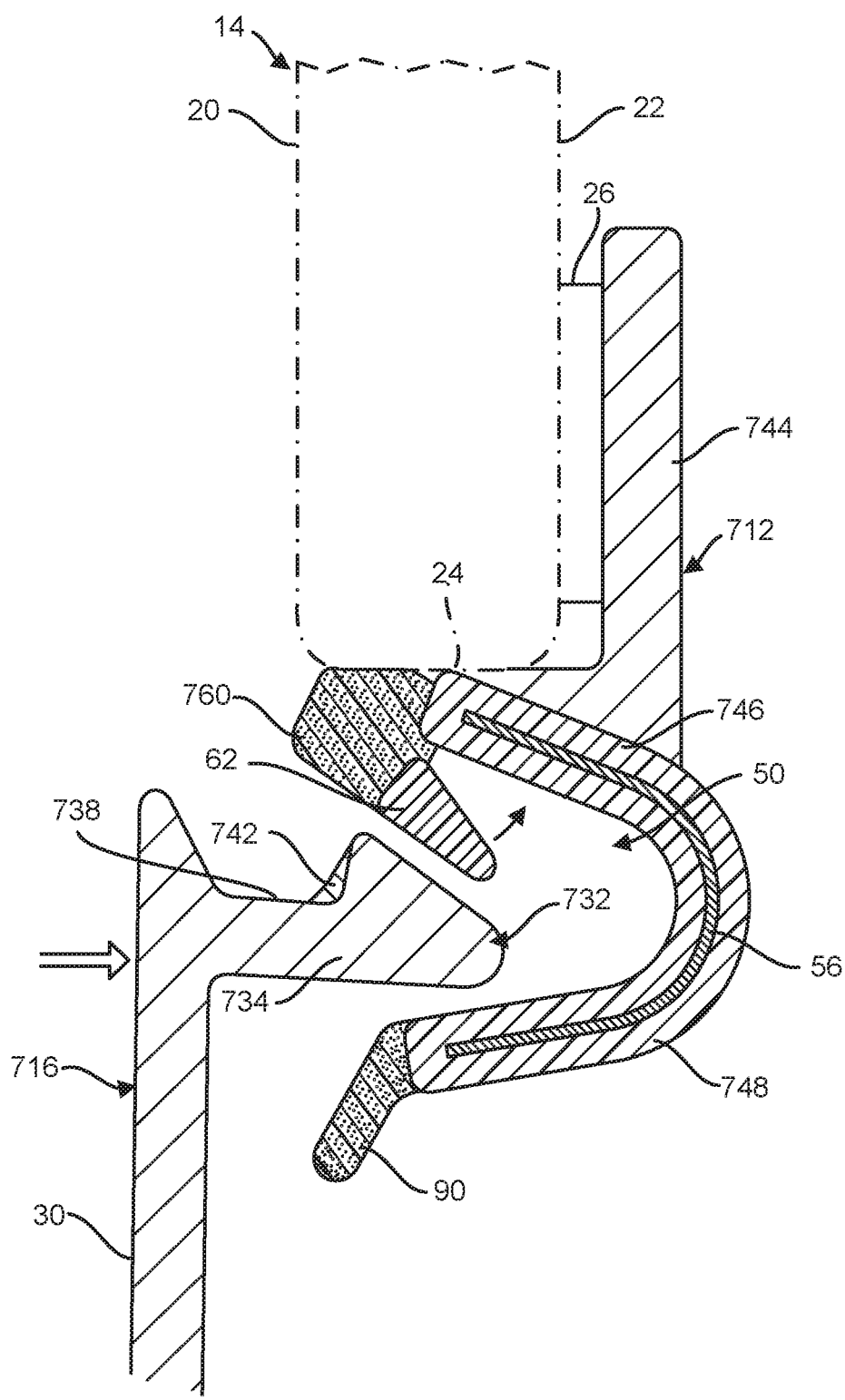
FIG. 10A is a side cross-sectional view of an assembly of a vehicle window pane and an auxiliary device using a profile element in accordance with another embodiment, defining an under-flush seal design with an elongated cushion added for the auxiliary device, and the assembly shown during assembly of the parts.
Figure 10B:
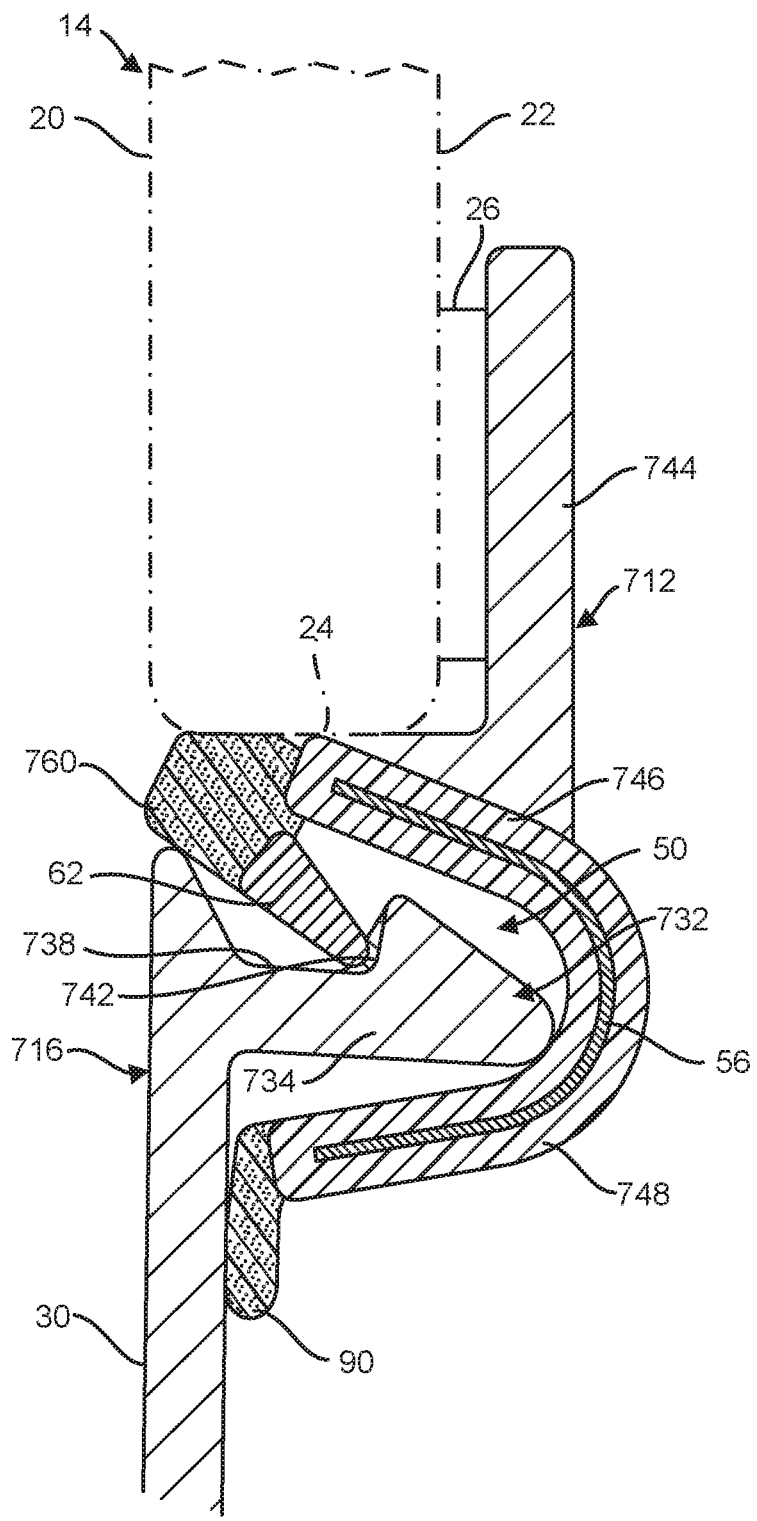
FIG. 10B is a side cross-sectional view of the assembly of FIG. 10A, with the assembly shown fully engaged and stabilized.

With reference to FIGS. 10A and 10B, another embodiment of the profile element 712 is shown in the fully assembled position with an auxiliary device 716 and a window pane 14. The profile element 712 of this embodiment is largely similar to the embodiment shown in FIG. 9, such as by including the rounded U-shaped profile at the first leg 746 and the second leg 748 and the separately-provided base 744, which may be rigid or flexible as set forth above. The resilient knee element 760 of this embodiment is further modified to define an under-flush seal design that extends along only a portion of the terminal edge 24 of the window pane 14 after installation. Nevertheless, the knee element 760 continues to provide the resilient flexing that enables the rigid detent element 62 to connect with and lock the auxiliary device 716 in position at the retention cavity 50, while also providing the sealing function. The cushion 90 is modified to be the same as the elongated version previously described with reference to FIGS. 6A and 6B. Thus, it will be understood from FIGS. 10A and 10B and other embodiments that the various redesigned elements of the profile elements may be combined in any manner from these embodiments as desired by the end user or consumer.

The other significant variation of this embodiment is present in the auxiliary device 716, which includes a modified fastening dart 732. To this end, the surface 742 of the dart head 734 that engages with the detent element 62 and faces towards the latch groove 738 is modified to have a shallower angle compared to the previous embodiments. This modification may vary the amount of snapping sound and tactile feeling produced when the detent element 62 snaps past the fastening dart 732 as the auxiliary device 716 moves from the position in FIG. 10A to the fully assembled and stabilized position of FIG. 10B. In all other respects, including functionality and materials, the profile element 712 of the FIGS. 10A and 10B embodiment is the same as the embodiments described previously, and therefore is configured to enable reliable connection of the auxiliary device 716 and the window pane 14.

Figure 11:
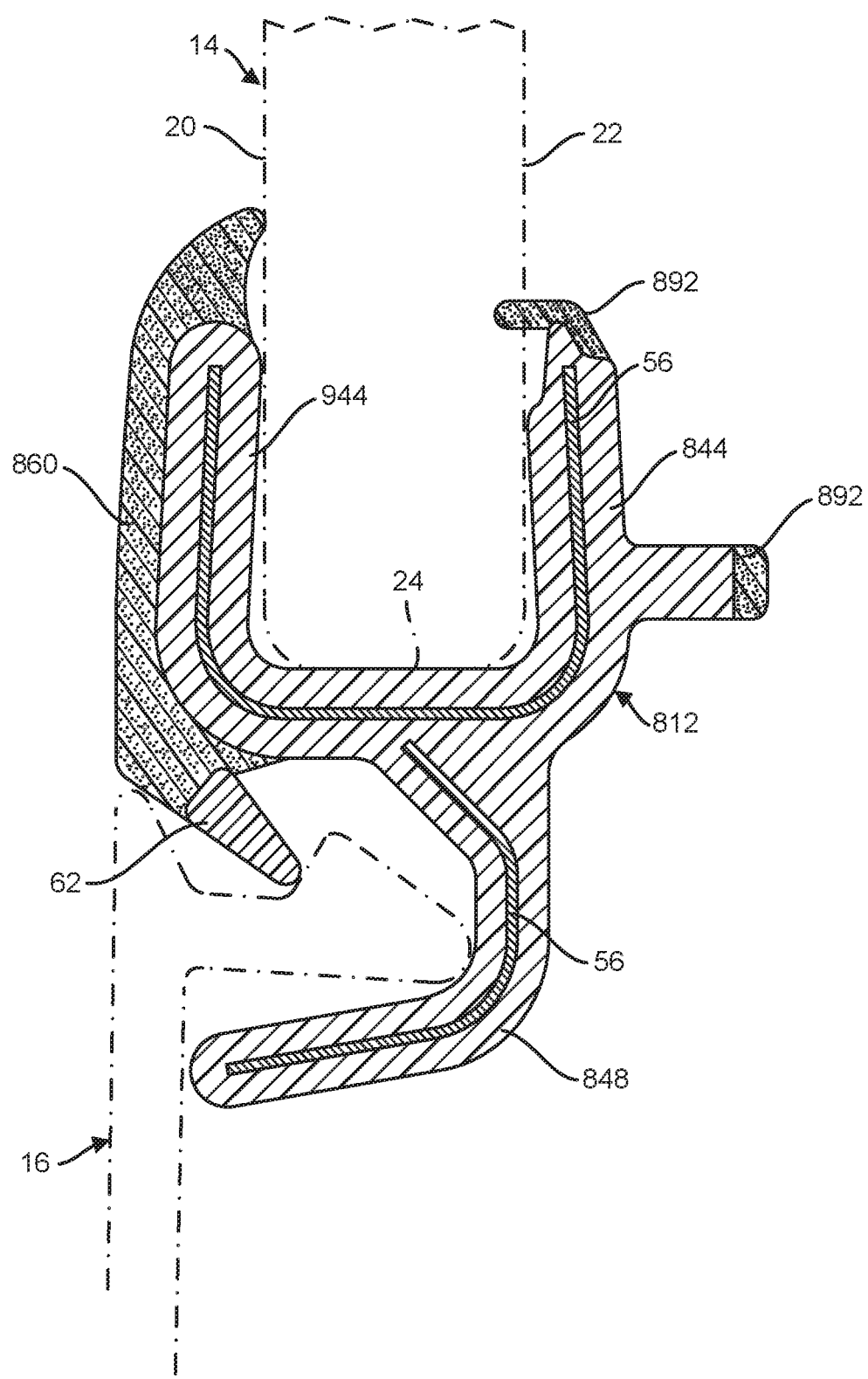
FIG. 11 is a side cross-sectional view of an assembly of a vehicle window pane and an auxiliary device using a profile element in accordance with another embodiment, the profile element including a U-shaped base for receiving a portion of the window pane.

In FIG. 11, another embodiment of the profile element 812 is shown in the fully assembled position with an auxiliary device 16 and a window pane 14. The profile element 812 of this embodiment differs from the embodiments described above in a few aspects. For example, the base 844 of the profile element 812 is modified to be a U-shaped design that wraps around the bottom end of the window pane 14 and therefore engages with the terminal edge 24 as well as the outer surface 20 and the inner surface 22. The base 844 therefore is secured to the window pane 14 by the shape of the base 844 and possibly by an adhesive-type connection. The base 844 therefore incorporates or includes the first leg of previous designs, but a generally L-shaped second leg 848 continues to extend from the base 844 in a similar manner as before to define a retention cavity 50. Metallic strips 56 are positioned for reinforcement in each of the base 844 and the second leg 848. This embodiment of the profile element 812 includes a revised version of the resilient knee element 860 that extends over an entirety of the portion of the base 844 that engages with the outer surface 20 of the window pane 14. Therefore, the knee element 860 is over-flush design and contacts the outer surface 20 of the window pane 14 above the base 844, while also serving as a flexible or resilient connector for the rigid detent element 62 that locks the auxiliary device 16 in position at the retention cavity 50. The base 844 may also include additional resilient seal bumpers 892 along an opposite side from the knee element 860 to engage with the inner surface 22 of the window pane 14 and/or a vehicle body (not shown). In all other respects, including functionality and materials, the profile element 812 of the FIG. 11 embodiment is the same as the embodiments described previously, and therefore is configured to enable reliable connection of the auxiliary device 16 and the window pane 14.

Figure 12:
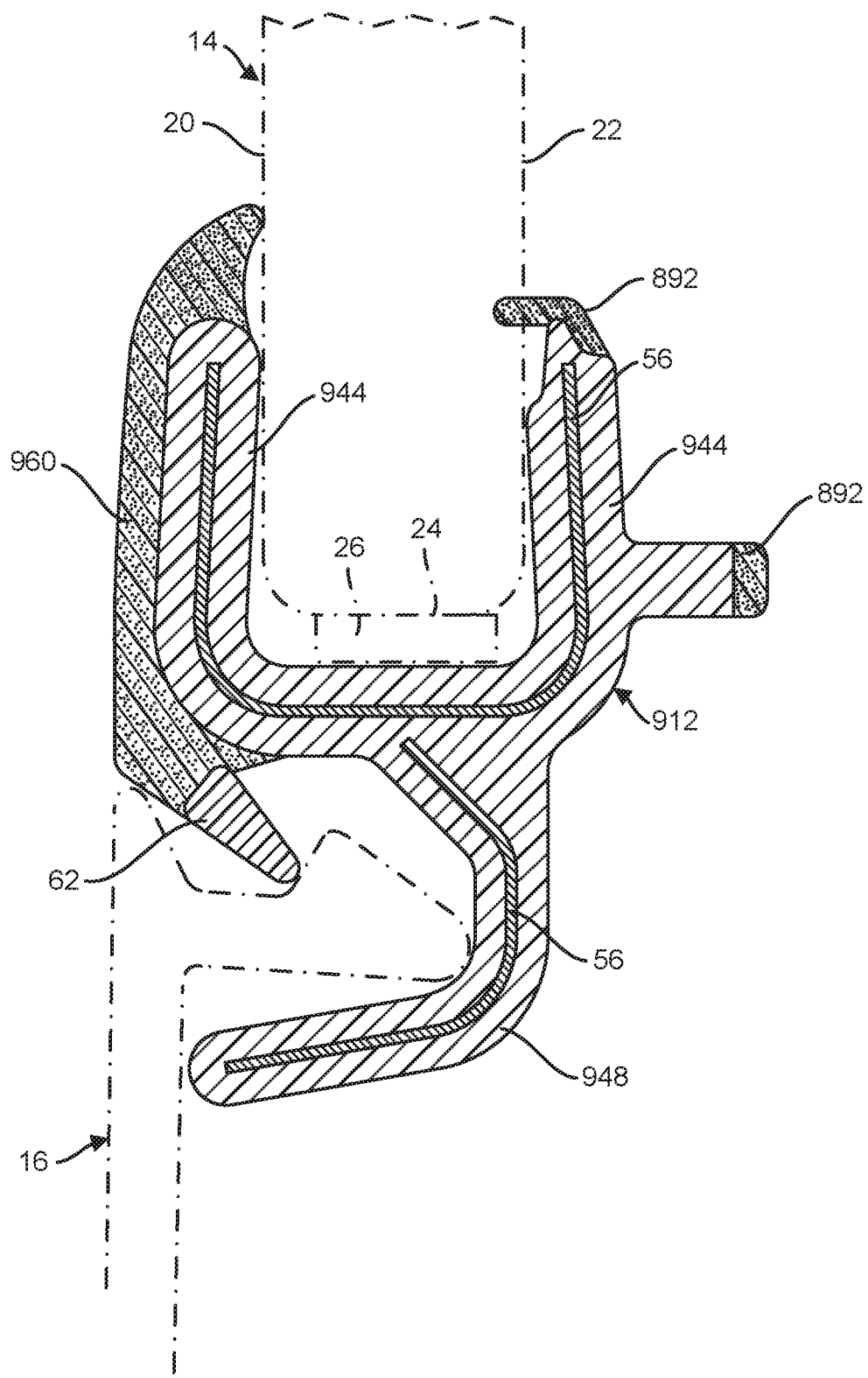
FIG. 12 is a side cross-sectional view of an assembly of a vehicle window pane and an auxiliary device using a profile element in accordance with another embodiment, the profile element including a U-shaped base for receiving a portion of the window pane.

Turning to FIG. 12, another embodiment of the profile element 912 is shown in the fully assembled position with an auxiliary device 16 and a window pane 14. The profile element 912 of this embodiment is largely similar to the embodiment shown in FIG. 11, such as by including the U-shaped base 944 and the second leg 948 extending therefrom, as well as the same type of seal bumpers 892 and resilient knee element 960 (this is identical to 860). Although the U-shaped base 944 may be sufficient on its own to remain clamped onto the bottom end of the window pane 14 without additional adhesive or the like as shown in FIG. 11, it is also possible to include adhesive tape 26 or a similar securing agent along the connection of the base 944 and the terminal edge 24 of the window pane 14 as shown in FIG. 12. In all other respects, including functionality and materials, the profile element 912 of the FIG. 12 embodiment is the same as the embodiments described previously, and therefore is configured to enable reliable connection of the auxiliary device 16 and the window pane 14.

Figure 13:
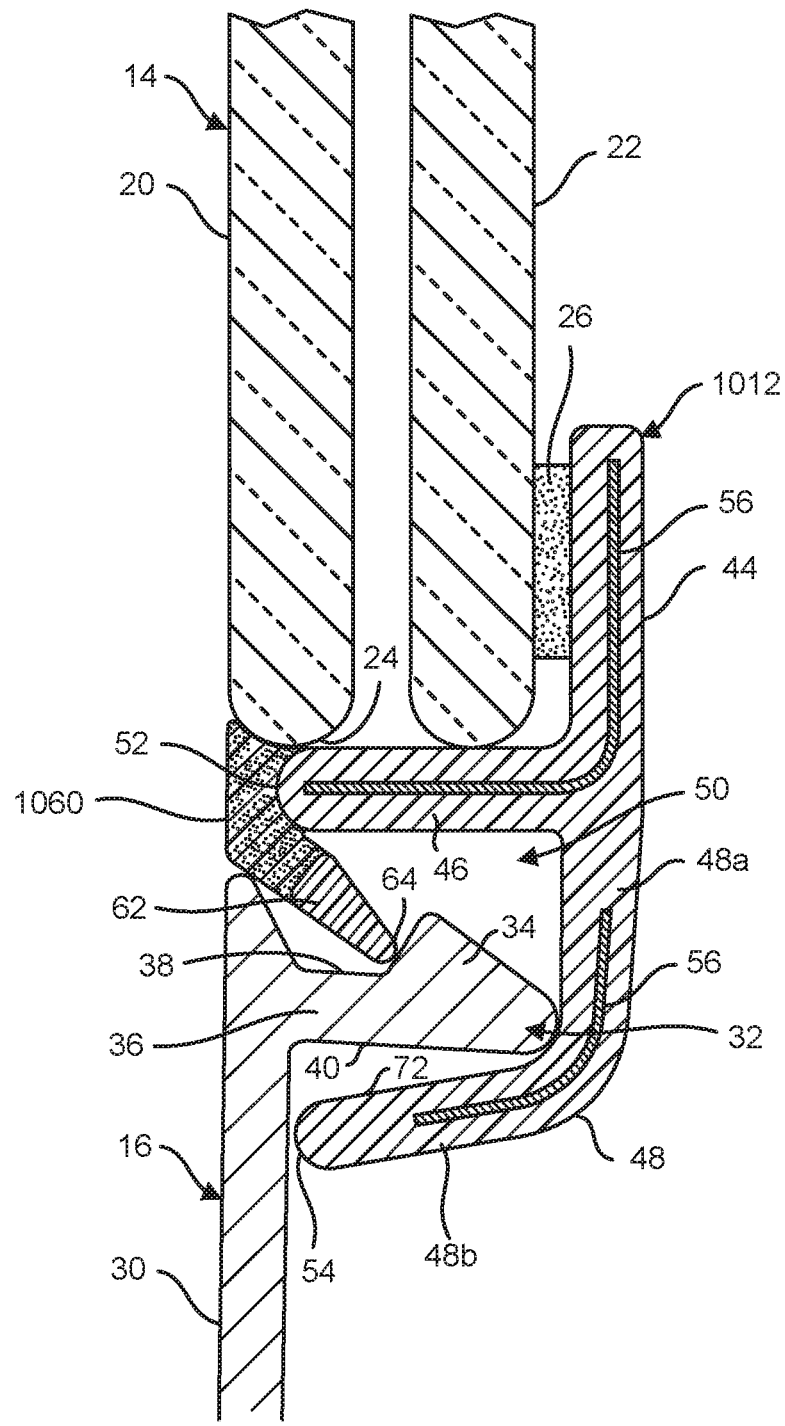
FIG. 13 is a side cross-sectional view of an assembly of a vehicle window pane and an auxiliary device using a profile element in accordance with another embodiment, defining a flush seal design.

Referring now to FIG. 13, another embodiment of the profile element 1012 is shown in the fully assembled position with an auxiliary device 16 and a window pane 14. The profile element 1012 of this embodiment is largely similar to the embodiment shown in FIG. 1. The resilient knee element 1060 is further modified to define a flush seal design that extends only along a portion of the terminal edge 24 of the window pane 14 after installation. The flush seal design can offer functional and/or aesthetic advantages, such as permitting windshield wipers to travel over the profile element to rest on the auxiliary device, or provide a finish with no ledges or gaps. Nevertheless, the knee element 1060 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. In all other respects, including functionality and materials, the profile element 1012 of the FIG. 13 embodiment is the same as the embodiments described previously, and therefore is configured to enable reliable connection of the auxiliary device 16 and the window pane 14.

Figure 14:
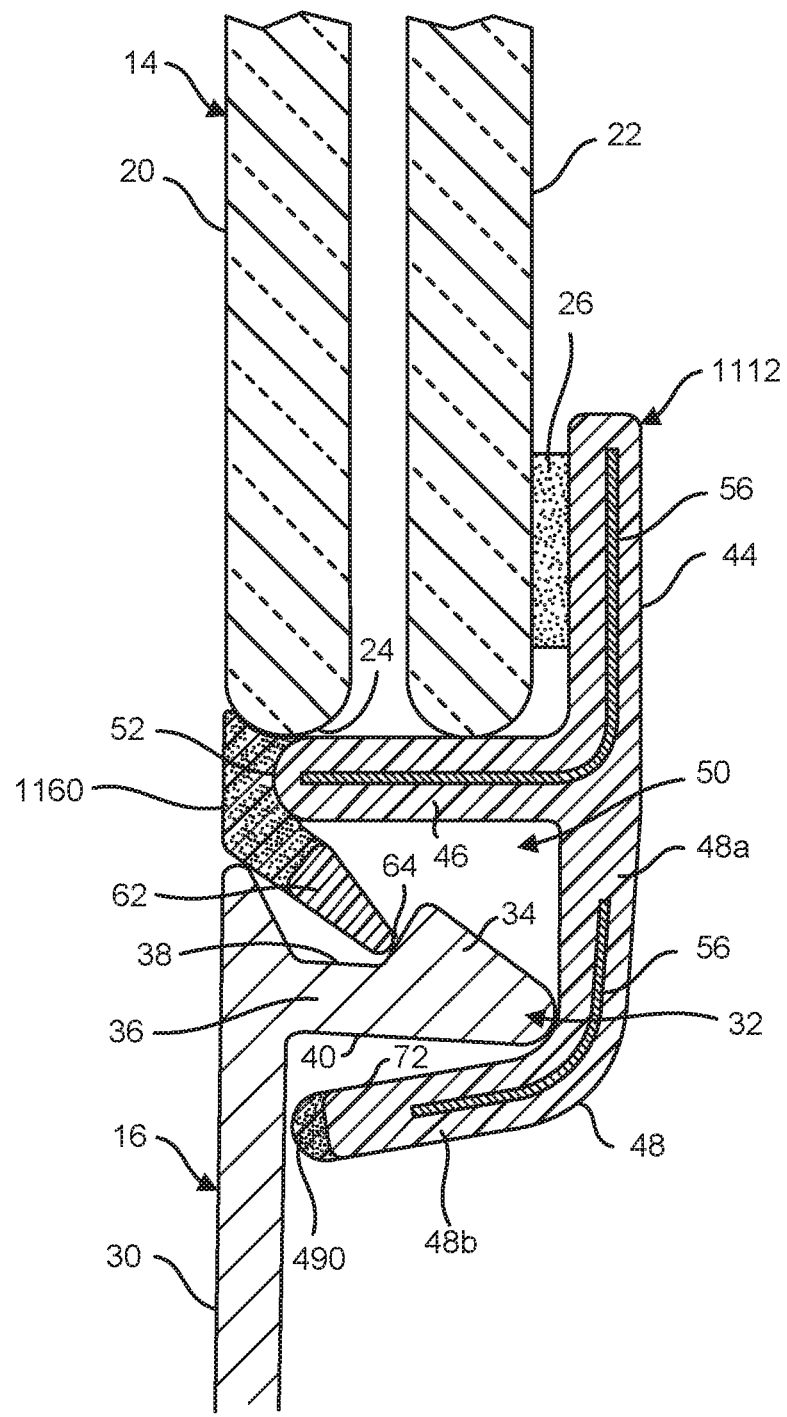
FIG. 14 is a side cross-sectional view of an assembly of a vehicle window pane and an auxiliary device using a profile element in accordance with another embodiment, defining a flush seal design with a small cushion added for the auxiliary device.

Referring now to FIG. 14, another embodiment of the profile element 1112 is shown in the fully assembled position with an auxiliary device 16 and a window pane 14. The profile element 1112 of this embodiment is largely similar to the embodiment shown in FIG. 1. The resilient knee element 1160 is further modified to define a flush seal design that extends only along a portion of the terminal edge 24 of the window pane 14 after installation. The flush seal design can offer functional and/or aesthetic advantages, such as permitting windshield wipers to travel over the profile element to rest on the auxiliary device, or provide a finish with no ledges or gaps. Nevertheless, the knee element 1160 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. The cushion 490 is the same as described with reference to previous embodiments, e.g., formed as an end cap adjacent to the leading end 54 rather than an elongated piece. In all other respects, including functionality and materials, the profile element 1112 of the FIG. 14 embodiment is the same as the embodiments described previously, and therefore is configured to enable reliable connection of the auxiliary device 16 and the window pane 14.

Figure 15:
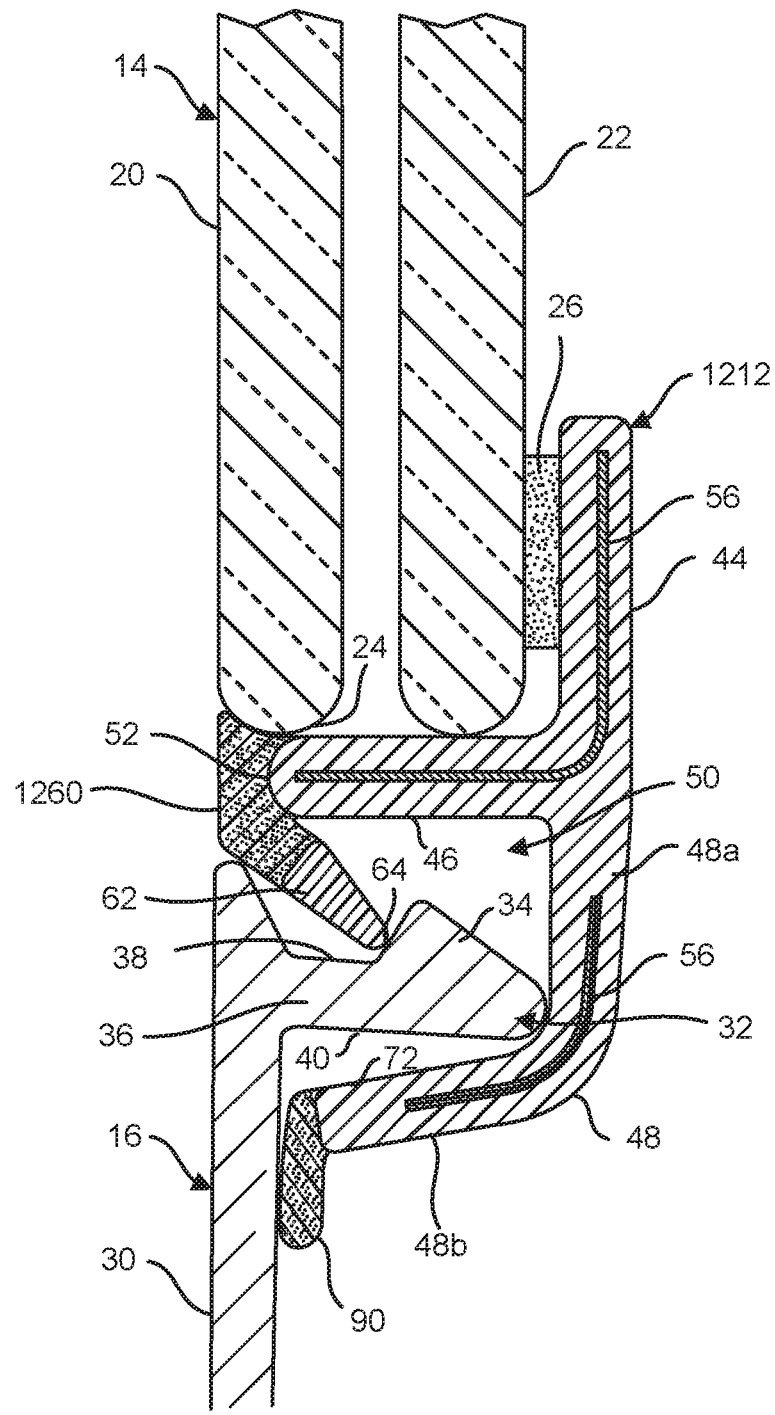
FIG. 15 is a side cross-sectional view of an assembly of a vehicle window pane and an auxiliary device using a profile element in accordance with another embodiment, defining a flush seal design with an elongate cushion added for the auxiliary device.

Referring now to FIG. 15, another embodiment of the profile element 1212 is shown in the fully assembled position with an auxiliary device 16 and a window pane 14. The profile element 1212 of this embodiment is largely similar to the embodiment shown in FIG. 1. The resilient knee element 1260 is further modified to define a flush seal design that extends only along a portion of the terminal edge 24 of the window pane 14 after installation. The flush seal design can offer functional and/or aesthetic advantages, such as permitting windshield wipers to travel over the profile element to rest on the auxiliary device, or provide a finish with no ledges or gaps. Nevertheless, the knee element 1260 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. The cushion 90 is the same as described with reference to previous embodiments, e.g., formed as an elongate piece. In all other respects, including functionality and materials, the profile element 1212 of the FIG. 15 embodiment is the same as the embodiments described previously, and therefore is configured to enable reliable connection of the auxiliary device 16 and the window pane 14.

Figure 16:
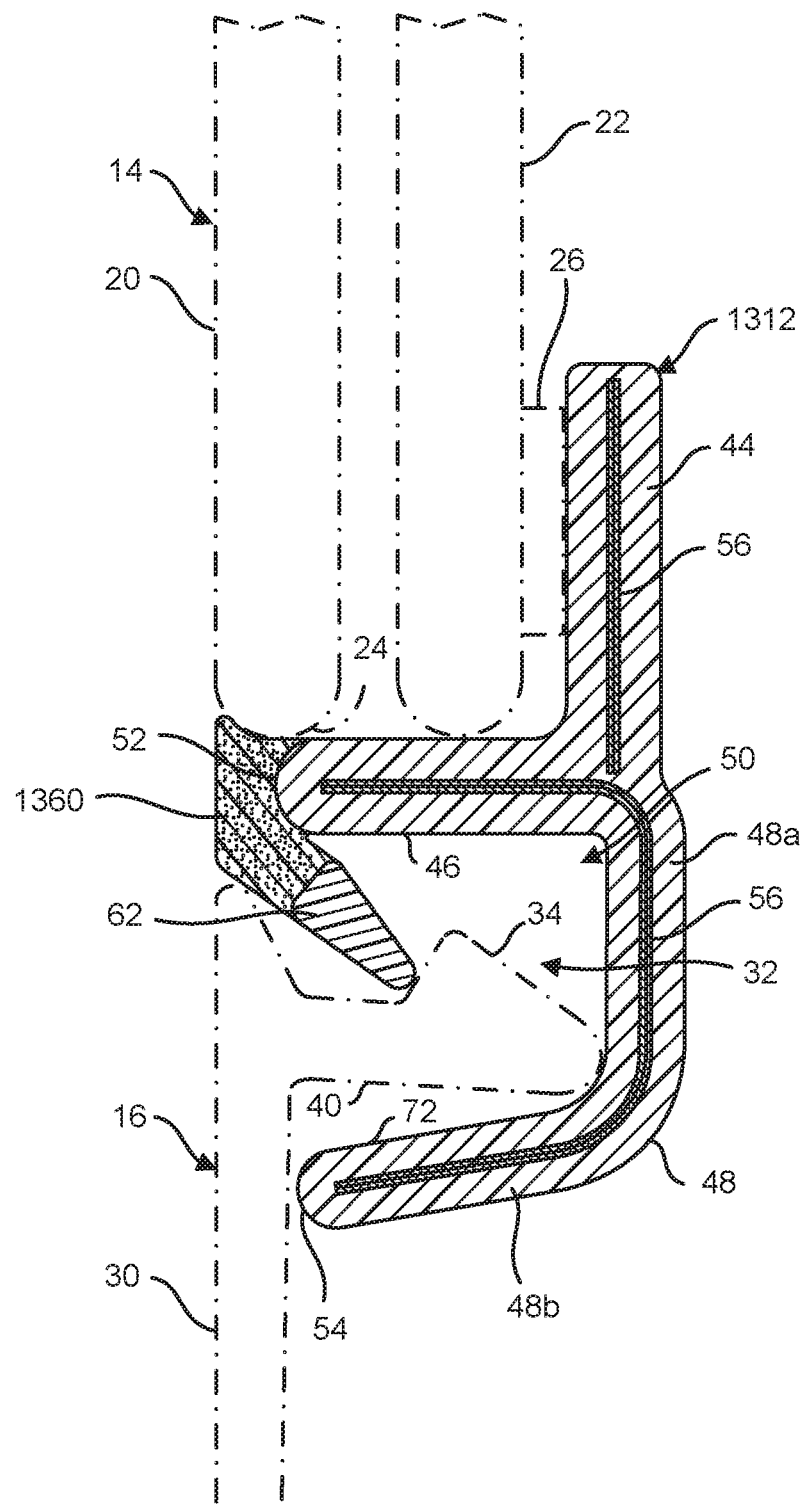
FIG. 16 is a side cross-sectional view of an assembly of a vehicle window pane and an auxiliary device using a profile element in accordance with another embodiment, defining a flush seal design.

Referring now to FIG. 16, another embodiment of the profile element 1312 is shown in the fully assembled position with an auxiliary device 16 and a window pane 14. The profile element 1312 of this embodiment is largely similar to the embodiments shown in FIGS. 4 and 5, such as by including the parallel base 44 and first portion 48a of the second leg 48. The resilient knee element 1360 is further modified to define a flush seal design that extends only along a portion of the terminal edge 24 of the window pane 14 after installation. Nevertheless, the knee element 1360 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. In all other respects, including functionality and materials, the profile element 1312 of the FIG. 16 embodiment is the same as the embodiments described previously, and therefore is configured to enable reliable connection of the auxiliary device 16 and the window pane 14.

Figure 17:
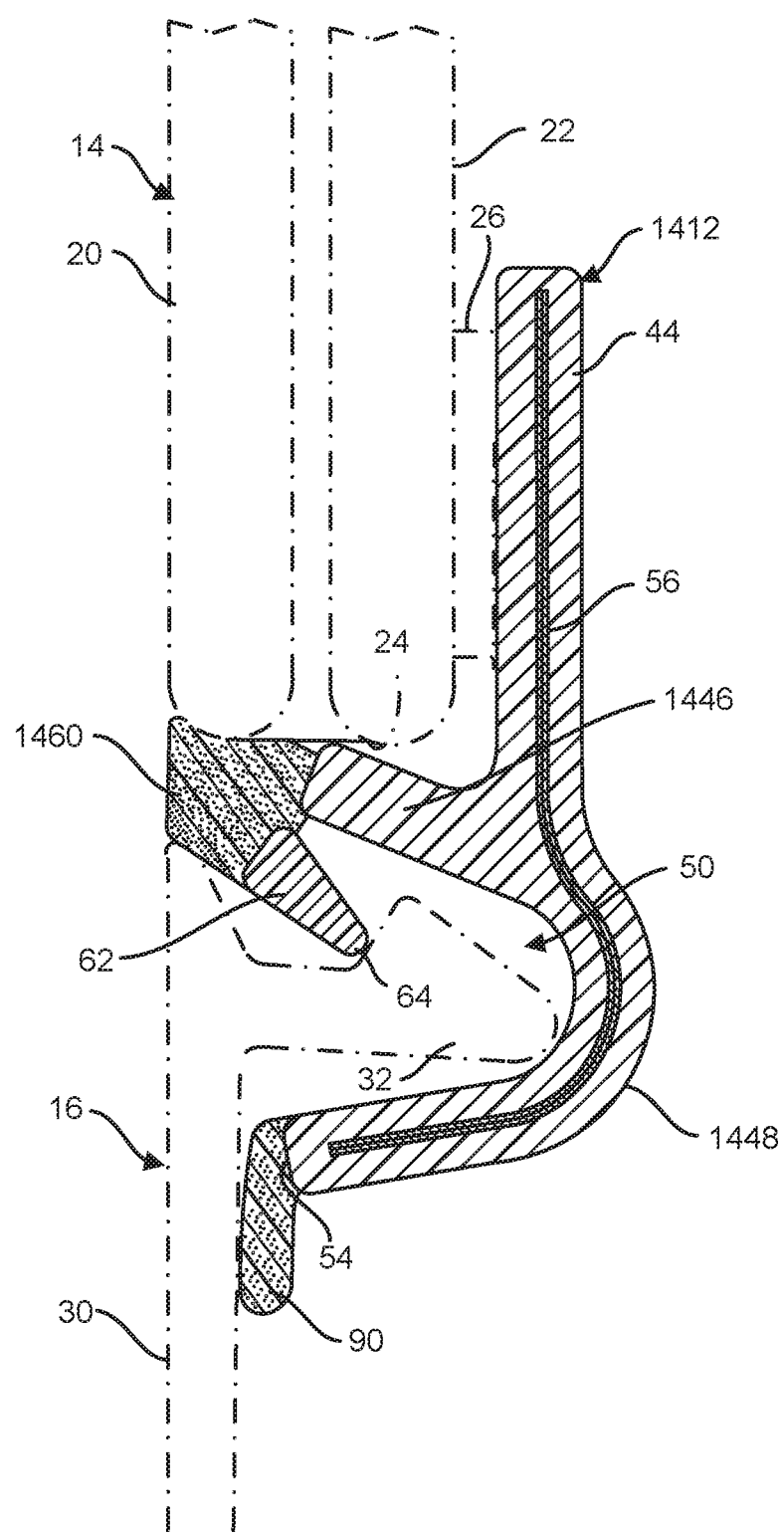
FIG. 17 is a side cross-sectional view of an assembly of a vehicle window pane and an auxiliary device using a profile element in accordance with another embodiment, defining a flush seal design with an elongate cushion added for the auxiliary device.

Now referring to FIG. 17, another embodiment of the profile element 1412 is shown in the fully assembled position with an auxiliary device 16 and a window pane 14. The profile element 1412 of this embodiment is largely similar to the embodiment shown in FIG. 6B, such as by including the rounded U-shaped profile at the first leg 1446 and the second leg 1448. Because the first leg 1446 extends at an angle to the terminal edge 24 of the window pane 14, the resilient knee element 1460 provides a seal engagement extending along at least a portion of the terminal edge 24. The knee element 1460 of this embodiment defines a flush seal design. Nevertheless, the knee element 1460 continues to provide the resilient flexing that enables the rigid detent element 62 to connect with and lock the auxiliary device 16 in position at the retention cavity 50. The cushion 90 is the same as described with reference to FIGS. 6A and 6B, e.g., formed as an elongate cushion adjacent to the leading end 54. In all other respects, including functionality and materials, the profile element 1412 of the FIG. 17 embodiment is the same as the embodiments described previously, and therefore is configured to enable reliable connection of the auxiliary device 16 and the window pane 14.

Figure 18:
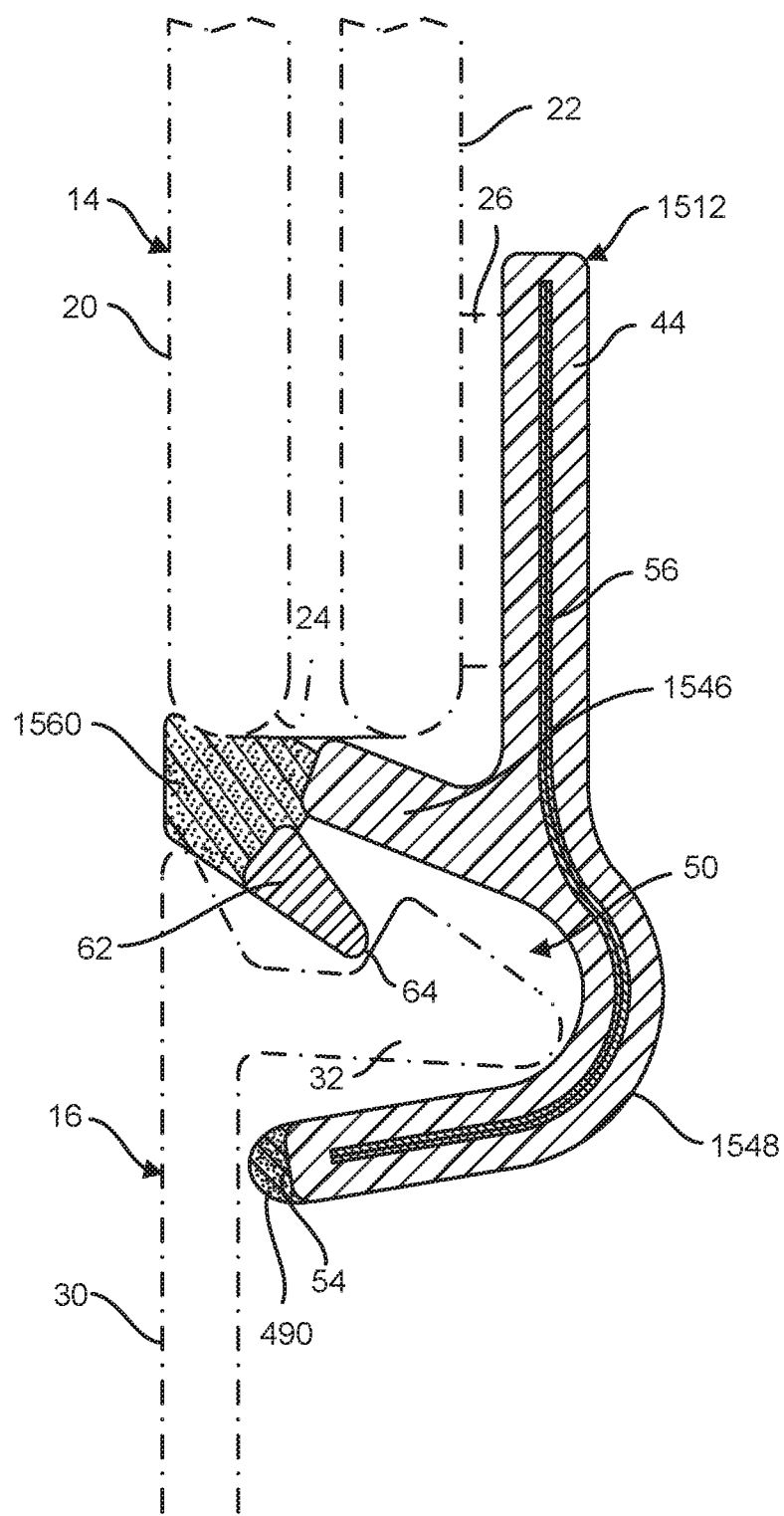
FIG. 18 is a side cross-sectional view of an assembly of a vehicle window pane and an auxiliary device using a profile element in accordance with another embodiment, defining a flush seal design with a small cushion added for the auxiliary device.

With reference to FIG. 18, another embodiment of the profile element 1512 is shown in the fully assembled position with an auxiliary device 16 and a window pane 14. The profile element 1512 of this embodiment is largely similar to the embodiments shown in FIGS. 7 and 8, such as by including the rounded U-shaped profile at the first leg 1546 and the second leg 1548. The resilient knee element 1560 of this embodiment is further modified to define a flush seal design that extends along only a portion of the terminal edge 24 of the window pane 14 after installation. Nevertheless, the knee element 1560 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. The cushion 490 is the same as described with reference to previous embodiments, e.g., formed as an end cap adjacent to the leading end 54 rather than an elongated piece. In all other respects, including functionality and materials, the profile element 1512 of the FIG. 18 embodiment is the same as the embodiments described previously, and therefore is configured to enable reliable connection of the auxiliary device 16 and the window pane 14.

Figure 19:
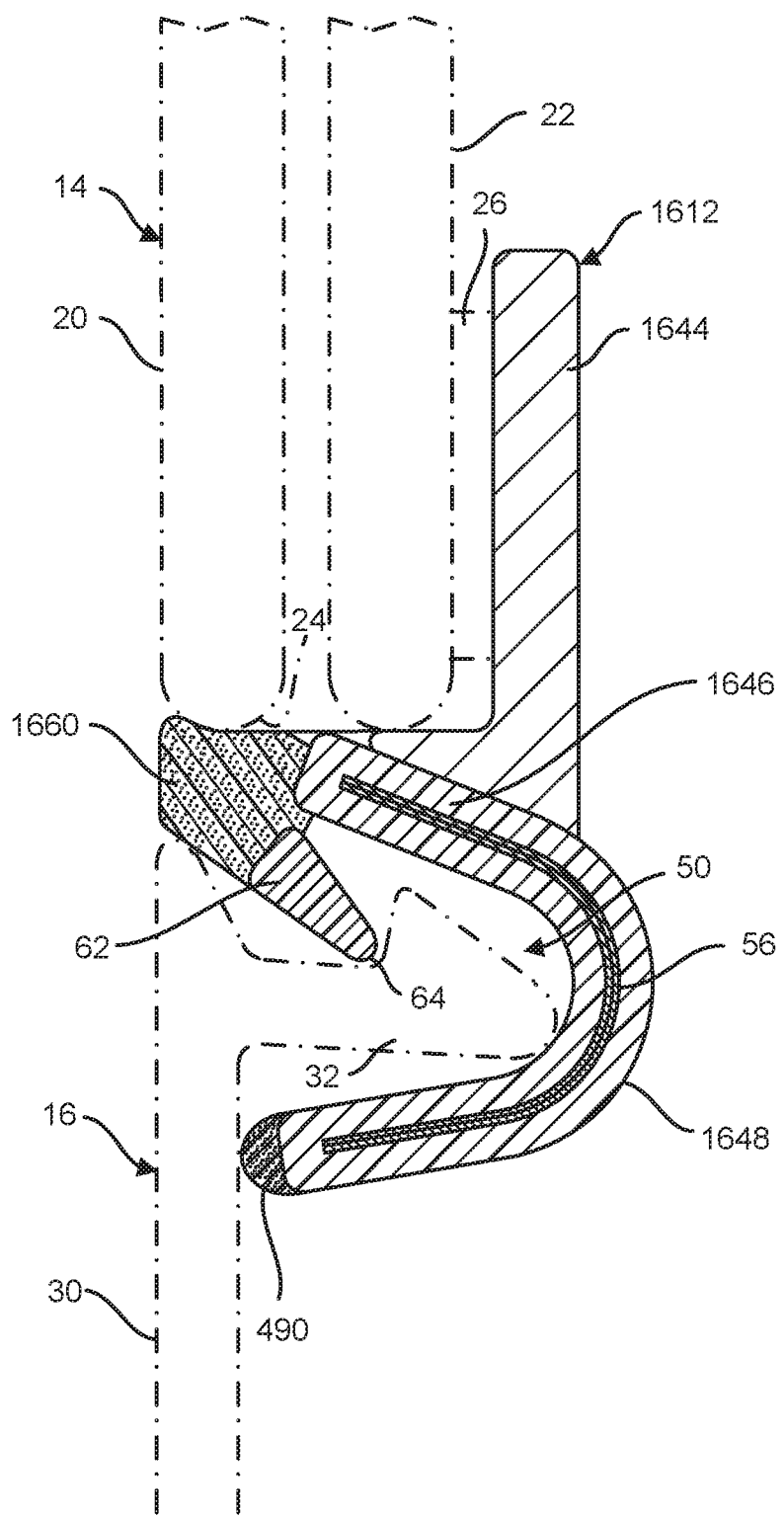
FIG. 19 is a side cross-sectional view of an assembly of a vehicle window pane and an auxiliary device using a profile element in accordance with another embodiment, defining a flush seal design with a small cushion added for the auxiliary device.

Turning to FIG. 19, another embodiment of the profile element 1612 is shown in the fully assembled position with an auxiliary device 16 and a window pane 14. The profile element 1612 of this embodiment is largely similar to the embodiment shown in FIG. 9, such as by including the rounded U-shaped profile at the first leg 1646 and the second leg 1648, the metallic strip 56 extending as a reinforcement through the first and second legs but not through the base 1644, and the base being a separate piece connected to or integrally formed with the first and second legs. The resilient knee element 1660 of this embodiment is further modified to define a flush seal design that extends along only a portion of the terminal edge 24 of the window pane 14 after installation. Nevertheless, the knee element 1660 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16.

The cushion 490 is the same as the previous embodiments, e.g., formed as an end cap adjacent to the leading end 54 rather than an elongated piece. In all other respects, including functionality and materials, the profile element 1612 of the FIG. 19 embodiment is the same as the embodiments described previously, and therefore is configured to enable reliable connection of the auxiliary device 16 and the window pane 14.

Figure 20:
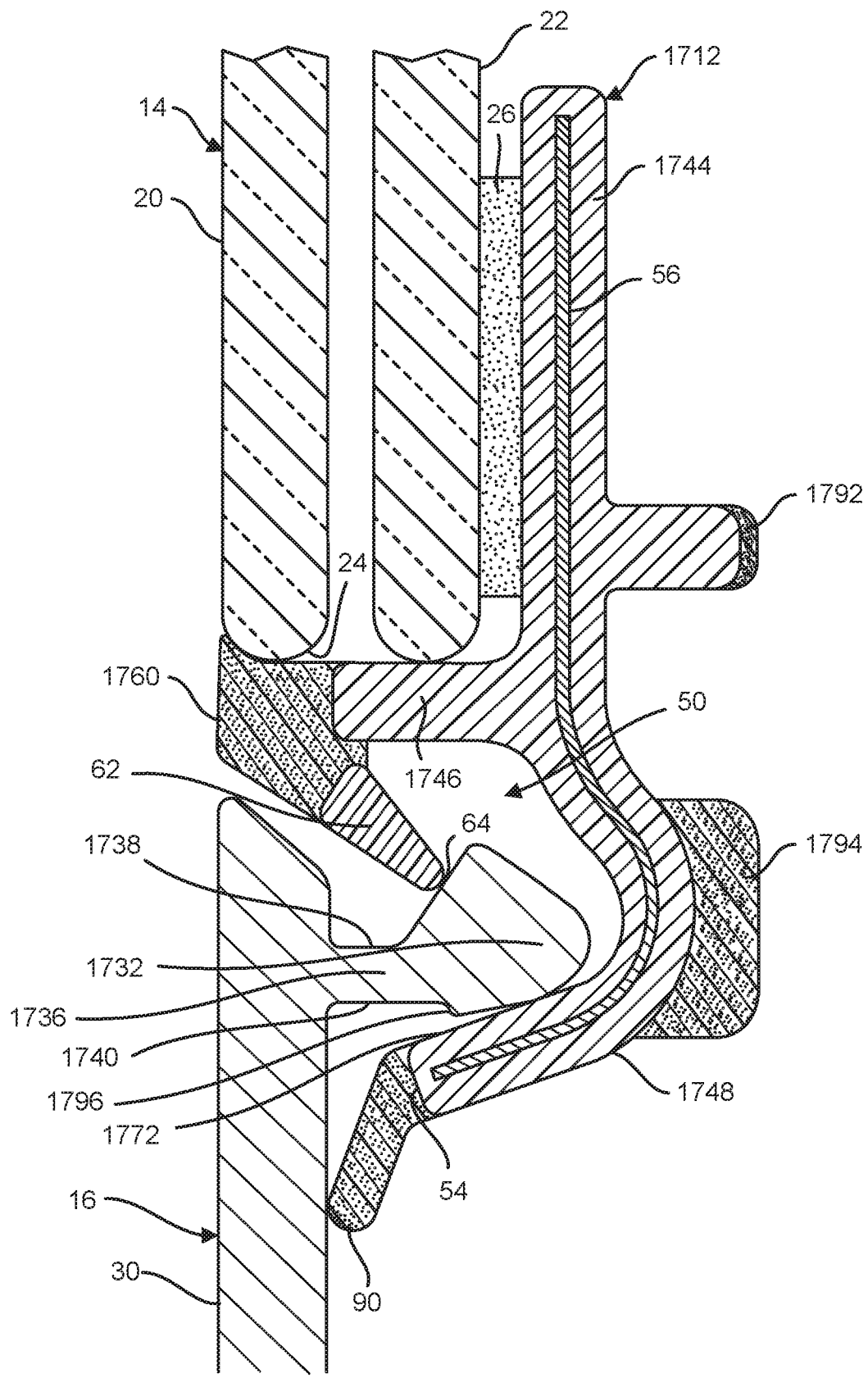
FIG. 20 is a side cross-sectional view of an assembly of a vehicle window pane and an auxiliary device using a profile element in accordance with another embodiment, defining a flush seal design with an elongate cushion added for the auxiliary device.

Referring now to FIG. 20, another embodiment of the profile element 1712 is shown in an assembled position with an auxiliary device 16 and a window pane 14. The profile element 1712 of this embodiment differs from those in previous embodiments in a few aspects, and incorporates certain elements from previous embodiments. To this end, the profile element 1712 includes a modified second leg 1748 defining a rounded, generally U-shaped profile defining the retention cavity 50. The first leg 1746 extends generally perpendicular to the base 1744, such as described above with reference to FIG. 1. The metallic strip 56 is an elongate single reinforcement that extends through substantially an entirety of the base 1744 and the second leg 1748 (but not the first leg 1746), as described above with reference to FIGS. 6A and 6B. The resilient knee element 1760 of this embodiment is further modified to define a flush seal design that extends along only a portion of the terminal edge 24 of the window pane 14 after installation. Nevertheless, the knee element 1760 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. The cushion 90 is the same as described with reference to FIGS. 6A and 6B, e.g., formed as an elongate cushion adjacent to the leading end 54. The profile element 1712 includes additional resilient seal bumpers 1792 and 1794 on the base 1744 and the second leg 1748, respectively, along an opposite side from the knee element 1760 to engage with the inner surface 22 of the window pane 14 and/or a vehicle body (not shown). In addition, the embodiment of FIG. 20 includes a modified fastening dart 1732. To this end, the fastening dart 1732 has a larger head and the latch groove 1738 is deeper compared to previous embodiments. The dart can also include a bottom surface that is stepped or includes a detent 1796, although this detent is not used for any latching function. The fastening dart 1732 is similar to certain auxiliary devices in the market, and FIG. 20 illustrates the features of the present disclosure as it can interact with certain available components. In all other respects, including functionality and materials, the profile element 1712 of the FIG. 20 embodiment is the same as the embodiments described previously, and therefore is configured to enable reliable connection of the auxiliary device 16 and the window pane 14.

Figure 21:
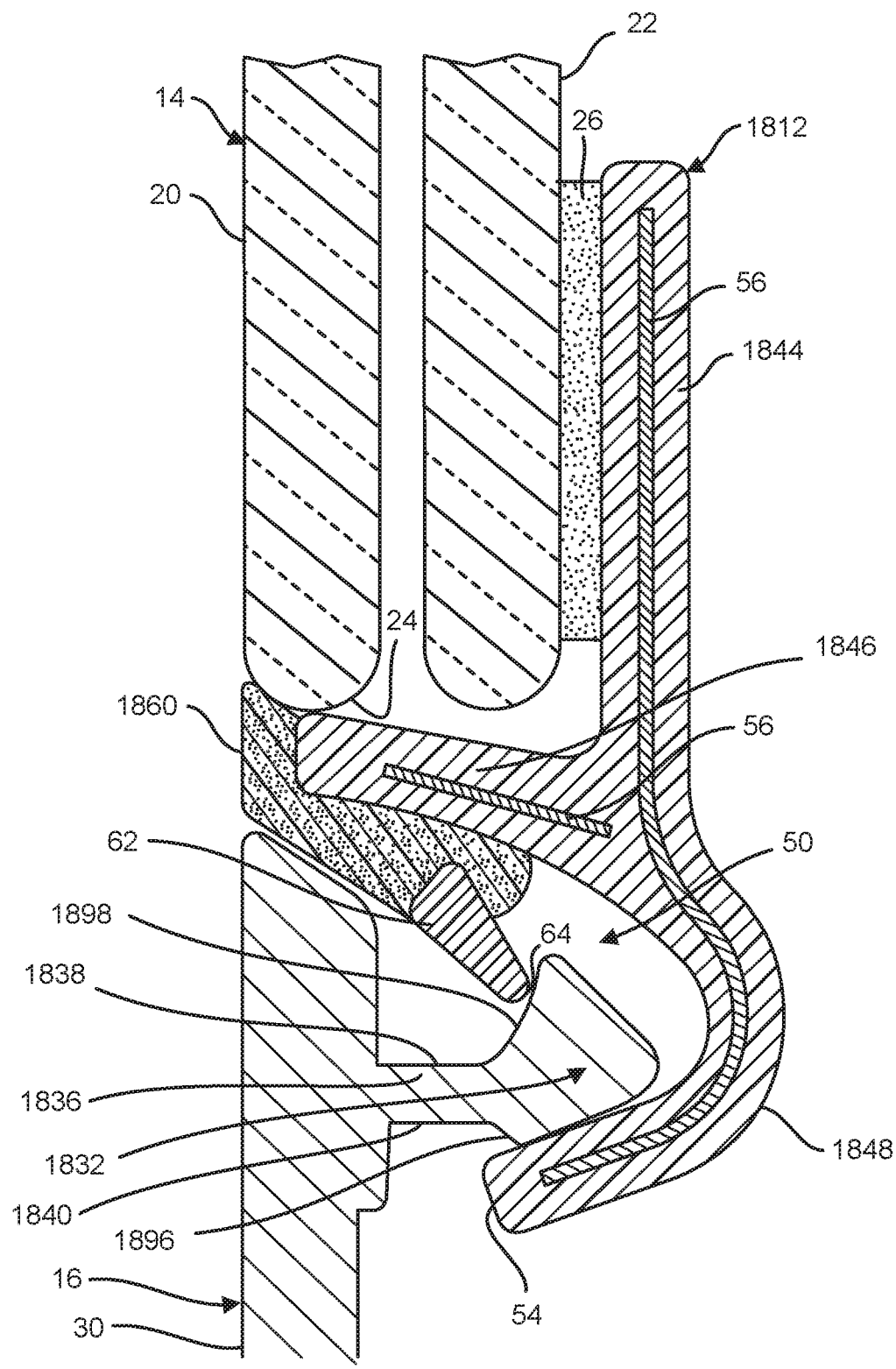
FIG. 21 is a side cross-sectional view of an assembly of a vehicle window pane and an auxiliary device using a profile element in accordance with another embodiment, defining a flush seal design.

With reference to FIG. 21, another embodiment of the profile element 1812 is shown in an assembled position in an assembled position with an auxiliary device 16 and a window pane 14. The profile element 1812 of this embodiment differs from those in previous embodiments in a few aspects, and incorporates certain elements from previous embodiments. To this end, the profile element 1812 includes a modified first leg 1846 and second leg 1848 defining a rounded, generally U-shaped profile forming the retention cavity 50. The first leg 1846 extends at an angle to the base 1844 and the terminal edge 24 of the window pane 14. The profile element 1812 includes an elongate reinforcement metallic strip 56 that extends through substantially an entirety of the base 1844 and the second leg 1848, and a separate metallic strip 56 reinforcing the first leg 1846. The resilient knee element 1860 of this embodiment defines a flush seal design that extends along only a portion of the terminal edge 24 of the window pane 14 after installation. The resilient knee 1860 of this embodiment also extends along a portion of the first leg 1846 and between the first leg and an upper surface of the rigid detent element 62. This extension of the knee element 1860 affects the required insertion and removal forces for connecting the fastening dart. If the resilient knee element 1860 extends further along the detent element 62, greater insertion and removal forces are required. If the resilient knee element 1860 extends a shorter distance along the detent element (or only engages an end of the detent element), smaller insertion and removal forces are required. It is understood that the resilient knee element in any of the above described embodiments can be enlarged or reduced to vary the required insertion and removal forces. Nevertheless, the knee element 1860 continues to provide the resilient flexing that enables the rigid detent element 62 to connect with and lock the auxiliary device 16 in position at the retention cavity 50, while also providing the sealing function for any water or liquid that runs down the window pane 14 and onto or past the auxiliary device 16. In addition, the embodiment of FIG. 21 includes a modified fastening dart 1832. To this end, the fastening dart 1832 has a larger head and the surface 1898 of the dart head that engages with the detent element 62 and faces towards the latch groove 1838 is generally rounded, and latch groove 1838 is deeper compared to certain previous embodiments. The dart can also include a bottom surface that includes an angled portion 1896, although this portion is not used for any latching function. The fastening dart 1832 is similar to certain auxiliary devices in the market, and FIG. 21 illustrates the features of the present disclosure as they can interact with certain available components. In all other respects, including functionality and materials, the profile element 1812 of the FIG. 21 embodiment is the same as the embodiments described previously, and therefore is configured to enable reliable connection of the auxiliary device 16 and the window pane 14.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Certain aspects of the embodiments can be combined with certain other aspects of other embodiments within the scope of the present disclosure. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A profile element for connecting a vehicle window pane to an auxiliary device, the profile element comprising:
   a first leg including a first leading end and configured to be positioned adjacent to a terminal edge of the window pane;
   a second leg extending from the first leg at a junction opposite the first leading end of the first leg and extending to a second leading end, the first and second legs collectively defining a generally U-shaped retention cavity configured to receive a fastening dart of the auxiliary device, wherein the first and second legs are formed from a rigid polymer material;

a resilient knee element formed from a flexible polymer material connected to the first leading end of the first leg, the knee element configured to act as a seal along the terminal edge of the window pane; and a detent element formed from rigid polymer material and connected to the knee element opposite the first leg, the rigid detent element projecting towards and into the retention cavity in a rest position of the knee element, wherein the detent element is configured to engage the fastening dart of the auxiliary device to retain the auxiliary device in position when the fastening dart is inserted into the retention cavity, and wherein the knee element flexes and moves to enable movement of the detent element during installation or extraction of the fastening dart relative to the retention cavity.

2. The profile element of claim 1, wherein the fastening dart of the auxiliary device is formed from rigid material, and the knee element is configured to snap the detent element into engagement with the fastening dart of the auxiliary device so as to generate an audible snap noise and a tactile snap feeling that can be observed to confirm proper connection of elements when assembling the auxiliary device to the window pane with the profile element.

3. The profile element of claim 1, wherein the knee element flexes and moves to a greater extent during extraction of the fastening dart from the retention cavity than during installation of the fastening dart into the retention cavity, thereby requiring more force to be applied to extract the auxiliary device than install the auxiliary device.

4. The profile element of claim 3, wherein the second leg does not deflect relative to the first leg during installation or extraction of the fastening dart relative to the retention cavity.

5. The profile element of claim 4, wherein the second leg defines a guiding profile that is angled to assist with alignment of the fastening dart during insertion into the retention cavity.

6. The profile element of claim 1, wherein the detent element and the second leg produce rigid contact points with the fastening dart of the auxiliary device in a fully assembled position, thereby enabling lateral movement of the auxiliary device to resist stresses from thermal expansion or vibrations in the environment.

7. The profile element of claim 1, wherein the resilient knee element defines an over-flush seal extending around the terminal edge of the window pane.

8. The profile element of claim 1, wherein the resilient knee element defines an under-flush seal extending along a portion of the terminal edge of the window pane.

9. The profile element of claim 1, wherein the resilient knee element defines a flush seal extending along a portion of the terminal edge of the window pane, the flush seal being flush with an outer surface of the window pane and an outer surface of the auxiliary device.

10. The profile element of claim 1, wherein the base is configured to be adhered to an inner surface of the window pane.

11. The profile element of claim 1, further comprising a reinforcement extending through a portion of at least one of the base, the first leg, and the second leg to enhance the rigidity of the profile element.

12. The profile element of claim 1, wherein the first leg extends generally perpendicular to the base.

13. The profile element of claim 1, wherein the first leg extends from the base at an angle relative to the terminal edge of the window pane.

14. The profile element of claim 1, further comprising a cushion extending from the second leading end and configured to abut an inner surface of the auxiliary device.

15. The profile element of claim 1, wherein the second leg extends in a direction away from the first leg such that an obtuse angle is defined between the leading end of the first leg and the second leading end of the second leg.

16. An assembly comprising:
a window pane having an outer surface, an inner surface, and a terminal edge;
an auxiliary device having a fastening dart; and
a profile element positioned between the window pane and the auxiliary device and connecting the window pane and the auxiliary device, the profile element comprising:
a first leg including a first leading end and positioned adjacent to the terminal edge of the window pane;
a second leg extending from the first leg at a junction opposite the first leading end of the first leg and extending to a second leading end, the first and second legs collectively defining a generally U-shaped retention cavity configured to receive the fastening dart of the auxiliary device, wherein the first and second legs are formed from a rigid polymer material;
a resilient knee element formed from a flexible polymer material connected to the first leading end of the first leg, the knee element configured to act as a seal along the terminal edge of the window pane; and
a detent element formed from rigid polymer material and connected to the knee element opposite the first leg, the rigid detent element projecting towards and into the retention cavity in a rest position of the knee element, wherein the detent element is configured to engage the fastening dart of the auxiliary device to retain the auxiliary device in position when the fastening dart is inserted into the retention cavity, and wherein the knee element flexes and moves to enable movement of the detent element during installation or extraction of the fastening dart relative to the retention cavity.

17. The profile element of claim 16, wherein the fastening dart of the auxiliary device is formed from rigid material, and the knee element is configured to snap the detent element into engagement with the fastening dart of the auxiliary device so as to generate an audible snap noise and a tactile snap feeling that can be observed to confirm proper connection of elements when assembling the auxiliary device to the window pane with the profile element.

18. The profile element of claim 16, wherein the knee element flexes and moves to a greater extent during extraction of the fastening dart from the retention cavity than during installation of the fastening dart into the retention cavity, thereby requiring more force to be applied to extract the auxiliary device than install the auxiliary device.

19. The profile element of claim 18, wherein the second leg does not deflect relative to the first leg during installation or extraction of the fastening dart relative to the retention cavity.

20. The profile element of claim 19, wherein the second leg defines a guiding profile that is angled to assist with alignment of the fastening dart during insertion into the retention cavity.

* * * * *